US007934162B2

(12) United States Patent
Wong et al.

(10) Patent No.: US 7,934,162 B2
(45) Date of Patent: Apr. 26, 2011

(54) RUNNING STATE MIGRATION OF PLATFORM SPECIFIC GRAPHICAL USER INTERFACE WIDGETS BETWEEN HETEROGENEOUS DEVICE PLATFORMS

(75) Inventors: Hoi Lee Candy Wong, Sunnyvale, CA (US); Hao-hua Chu, Mountain View, CA (US); Masaji Katagiri, Los Altos, CA (US); Yu Song, Milpitas, CA (US); Shoji Kurakake, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1929 days.

(21) Appl. No.: 10/271,226

(22) Filed: Oct. 15, 2002

(65) Prior Publication Data

US 2003/0067485 A1    Apr. 10, 2003

Related U.S. Application Data

(63) Continuation-in-part of application No. 09/967,167, filed on Sep. 28, 2001, and a continuation-in-part of application No. 09/966,185, filed on Sep. 28, 2001, now abandoned.

(60) Provisional application No. 60/378,713, filed on May 8, 2002.

(51) Int. Cl.
*G06F 7/00* (2006.01)
*G06F 3/00* (2006.01)
*G06F 9/00* (2006.01)
*G06F 15/00* (2006.01)

(52) U.S. Cl. ......... 715/747; 715/744; 715/798; 715/762

(58) Field of Classification Search .............. 715/1–999; 707/1–999; 717/1–999
See application file for complete search history.

(56) References Cited

U.S. PATENT DOCUMENTS

| | | | | | |
|---|---|---|---|---|---|
| 5,583,983 | A | * | 12/1996 | Schmitter | 717/138 |
| 5,895,477 | A | * | 4/1999 | Orr et al. | 715/517 |
| 5,956,738 | A | * | 9/1999 | Shirakawa | 715/517 |
| 5,969,717 | A | * | 10/1999 | Ikemoto | 715/762 |
| 5,999,948 | A | | 12/1999 | Nelson et al. | |

(Continued)

FOREIGN PATENT DOCUMENTS

JP       05324232 A    12/1993

(Continued)

OTHER PUBLICATIONS

Gurevich et al., Investigating Java Concurrency Using Abstract State Machines, Lecture Notes in Computer Science Jan. 1, 2000. vol. 1912.*

(Continued)

*Primary Examiner* — William L Bashore
*Assistant Examiner* — Jordany Núñez
(74) *Attorney, Agent, or Firm* — Blakely, Sokoloff, Taylor & Zafman LLP

(57) ABSTRACT

A scaleable graphical user interface system for migrating the running state of graphical user interface widgets between heterogeneous device platforms includes a platform independent presentation model. The current running state of a first platform specific presentation operating on a first heterogeneous device platform may update the running state of the platform independent presentation model. The platform independent presentation model may be customized to generate a second platform specific presentation for a second heterogeneous device platform. The running state of the platform independent presentation module may be applied to the second platform specific presentation module to implement the current running state from the first heterogeneous device platform on the second heterogeneous device platform.

24 Claims, 19 Drawing Sheets

U.S. PATENT DOCUMENTS

| | | | |
|---|---|---|---|
| 6,037,939 A * | 3/2000 | Kashiwagi et al. | 715/798 |
| 6,097,382 A | 8/2000 | Rosen et al. | |
| 6,285,366 B1 | 9/2001 | Ng et al. | |
| 6,310,601 B1 | 10/2001 | Moore et al. | |
| 6,317,143 B1 | 11/2001 | Wugofski | |
| 6,353,448 B1 * | 3/2002 | Scarborough et al. | 715/744 |
| 6,429,882 B1 | 8/2002 | Abdelnur et al. | |
| 6,636,250 B1 | 10/2003 | Gasser | |
| 6,650,347 B1 | 11/2003 | Nulu et al. | |
| 2002/0167543 A1 | 11/2002 | Smith et al. | |
| 2003/0046316 A1 * | 3/2003 | Gergic et al. | 707/513 |
| 2003/0200254 A1 | 10/2003 | Wei | |

FOREIGN PATENT DOCUMENTS

| | | |
|---|---|---|
| JP | 07-244568 | 9/1995 |
| JP | 08-263243 | 10/1996 |
| JP | 2000082039 A | 3/2000 |

OTHER PUBLICATIONS

Chu, H., Song, H., Wong, C., and Kurakake, S., "Workshop on Application Models and Programming Tools for Ubiquitous Computing," *UbiTools '01* (Part of *ACM UbiComp '01*), Sep. 30, 2001, http://choices.cs.uiuc.edu/UbiTools01/.

Eisentein, J., Vanderdonckt, J., and Puerta, A., "Applying Model-Based Techniques to the Development of UIs for Mobile Computers," *Pro. of ACM IUI '01*, Jan. 2001, pp. 69-76.

Universal Interface Technologies, Inc., "User Interface Markup Language (UIML) Draft Specification," Document Version 17, Jan. 2000.

Olsen, D., Jefferies, S., Nielsen, T., Moyes, W., Fredrickson, P., "Cross-modal Interaction using XWeb," *Proc. of ACM UIST '00*, Nov. 2000.

Stephanidis, C., Savidis, A., and Akoumianakis, D., Tutorial on "Universally accessible UIs: The unified user interface development." *Tutorial in ACM chi '2001*, Apr. 2, 2001.

Masui, T., "Evolutionary learning of graph layout constraints from examples," *Proc. of ACM UIST '94*, Nov. 1994, pp. 103-108.

Szekely, P., Luo, P., and Neches, R., "Facilitating the Exploration of Interface Design Alternatives: The HUMANOID Model of Interface Design," *Proceedings ACM CHI '9*, May 1992, pp. 507-514.

Linton, M., Vlissides, J., and Calder, P., "Composing User Interfaces with InterViews," IEEE Computer, 22(2), Feb. 1989.

Vanderdonckt, J., "Knowledge-Based Systems for Automated User Interface Generation: The TRIDENT Experience," *Technical Report RP-95-010, Fac. Univ. de N-D de la Paix, Inst. D'Informatique*, Namur, 1995.

Thevenin, D. and Coutaz, J., "Plasticity of User Interfaces: Framework and Research Agenda," *Proc. of IFIP Interact '99*, Aug. 30-Sep. 3, 1999.

Bodart, F., Vanderdonckt, J., "On the Problem of Selecting Interaction Objects," *Proc. of HCI '94*, Aug. 1994, pp. 163-178.

"UIML Reference Manual", Harmonia, Inc., Dec. 1997, downloaded from http://www.uiml.org/specs/docs/uiml_v10_ref.PDF, pp. 1-132.

"User Interface Markup Language (UIML) Draft Specification" Harmonia, Inc., Document Version 17, Jan. 2000, downloaded from http://www.uiml.org/specs/docs/uiml20-17Jan00.pdf, pp. 1-63.

Thomas Rist, et al., "Getting the Mobile Users in: Three Systems that Support Collaboration in an Environment with Heterogeneous Communication Devices", ACM, May 2000, pp. 250-254.

Ken Miyashita, et al., "Interactive Generation of Graphical User Interfaces by Multiple Visual Examples", ACM, Nov. 1994, pp. 85-94.

Jacob Eisenstein, et al., "Applying Model-Based Techniques to the Development of UIs for Mobile Computers", Proceedings of IUI '01, Jan. 14-17, 2001, pp. 69-76.

Jacob Eisenstein, et al., "Adapting to Mobile Contexts with User-Interface Modeling", In Proceedings of WMCSA '00, Dec. 2000, pp. 83-92.

Japanese Notice of Reasons for Refusal for Japanese Patent Application No. 2003-092812, Apr. 14, 2009, 3 pages.

* cited by examiner

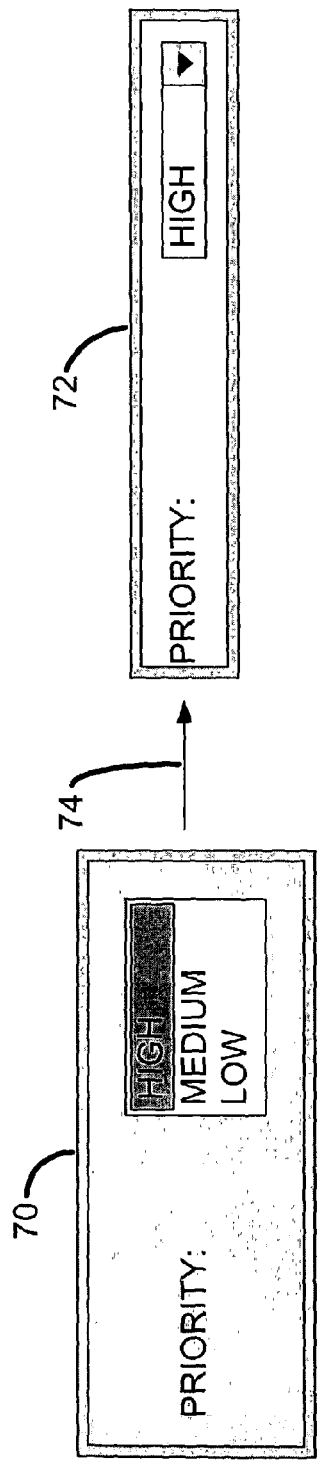
FIG. 5
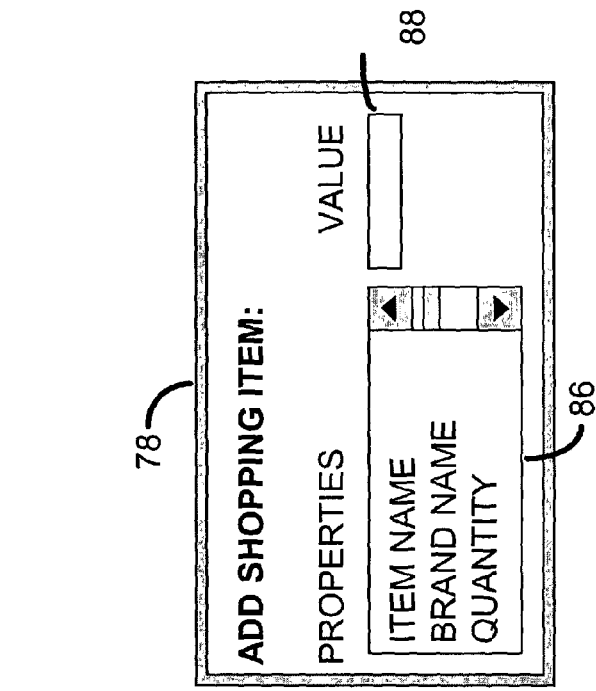
FIG. 6
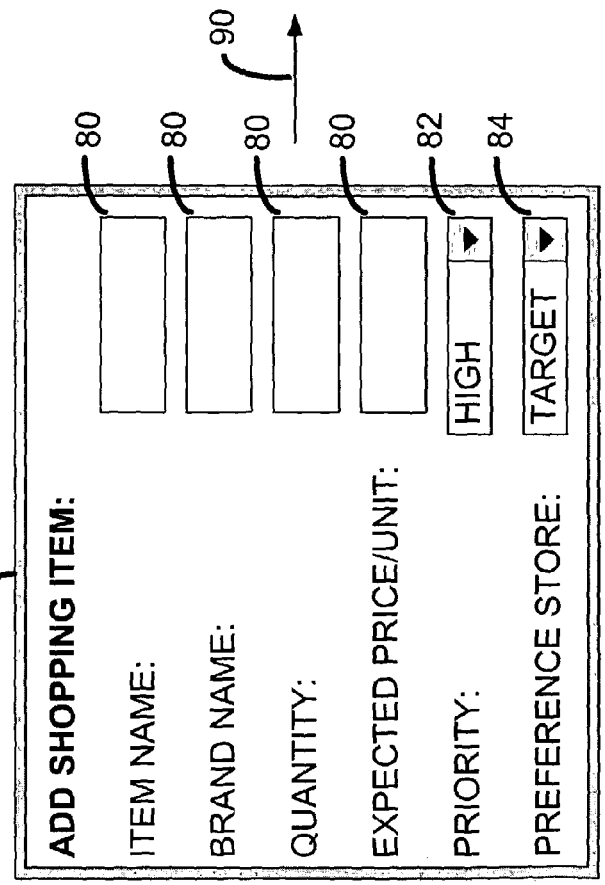

RUNNING STATE MIGRATION OF PLATFORM SPECIFIC GRAPHICAL USER INTERFACE WIDGETS BETWEEN HETEROGENEOUS DEVICE PLATFORMS

This is a continuation-in-part of both U.S. patent application Ser. No. 09/967,167, filed Sep. 28, 2001 and U.S. patent application Ser. No. 09/966,185, filed Sep. 28, 2001 now abandoned. In addition, this application claims the benefit pursuant to 35 U.S.C. §119(e) of U.S. provisional patent application Serial No.: 60/378,713, filed on May 8, 2002 all of which are incorporated herein by reference

FIELD OF THE INVENTION

The present invention relates generally to graphical user interfaces (GUI) and, more particularly, to migration of the running state of platform specific GUI widgets between heterogeneous device platforms.

BACKGROUND OF THE INVENTION

Personal electronic devices such as personal computers, personal digital assistants (PDAs), wireless telephones and pagers have become prevalent in recent years. These devices allow mobile computing by communication over wireless and/or wireline networks. The networks provide interconnection of these mobile devices with information sources as well as other similar devices. Commonly, the networks include communication over the Internet.

Typically, mobile computing devices include some form of user interface (UI). The nature of the user interface on a device is a function of the computing power and the hardware represented on the device. For example, a wireless telephone has limited computing power and a relatively small graphical user interface (GUI) with limited graphics and user interface capability. Conversely, a notebook personal computer has relatively extensive graphics capability, user interface capability and computing power. As the popularity of mobile devices increases, the main device platform for applications may shift from desktop personal computers to mobile devices.

One significant difficulty with developing applications for mobile devices is device heterogeneity. Due to variations in display size, display resolution, command input methods and GUI libraries, an application developer may have to re-design and re-implement applications for the graphical user interfaces (GUIs) of each device platform. With the large number of different mobile devices currently available, or coming into the market, re-design and re-implementation may be an ongoing, labor intensive and cost prohibitive endeavor.

One solution is through the development of model-based techniques. An example model-based technique is user interface modeling. In general, user interface modeling involves a platform model, a presentation model and a task model. The platform model describes the operational functionality forming the user interface for each device supported. The presentation model, describes the hierarchy, stylistic choices, selection and placement regarding the visual appearance of the user interface associated with the supported device(s). The task model identifies tasks that a user of the supported device (s) may perform. With this technique, mappings between the various models may be developed to produce a user interface for a particular device.

Implementation of the model-based approach typically includes development of a high level language to implement the models. In addition, developers typically build and specify significant portions of the models to support the devices. Since the high level language is fairly complex, developers usually must learn the language, as well as the execution mechanics, prior to implementing the model-based approach. Further, model-based approaches typically generate code based on the different model(s) that the developer builds. Slight differences in the user interface requirements of a device may result in considerable differences in the code generated for two seemingly similar devices. Accordingly, the complexity and level of programming expertise required by the developer is significant.

SUMMARY OF THE PRESENT INVENTION

The present invention discloses a non-model based scalable graphical user interface (SGUI) system. The SGUI system allows scaleable applications to operate on any of a plurality of heterogeneous device platforms. The scaleable applications may include an application graphical user interface (GUI). The application GUI may be adapted by the SGUI system to operate with the user interface of one of the heterogeneous device platforms on which the scaleable application is operating. Application developers may build application GUIs that are independent of the user interface capabilities within each of the heterogeneous device platforms without the complexities of the model-based approach. In addition, many of the complexities of user interfaces and GUI libraries associated with each of the heterogeneous device platforms may be avoided by application developers utilizing the SGUI system.

The SGUI system includes a scalable GUI library, a customizing module and a render manager module. The customizing module includes a task manager module and a transformation manager module. When a scaleable application is launched or migrated to one of the heterogeneous device platforms, which may be referred to as a target device platform, an intermediate representation of the application GUI is instantiated by the scaleable application. The intermediate representation is a platform independent presentation model in the form of a device platform independent logic structure that may include at least one logical panel and representation of at least one graphical user interface (GUI) component in a hierarchical configuration. Nodes within the intermediate representation may include container nodes representing the logical panels and component nodes representing the graphical user interface components.

The intermediate representation may be dynamically customized by the customizing module based on the capabilities of the target device platform, as well as properties specified by application developers of the application GUI. Customization of the intermediate representation converts the platform independent presentation model to a platform dependent logic structure representing a platform specific presentation.

When a scaleable application is migrated from a first heterogeneous device platform to a second heterogeneous device platform, the running state of a scaleable application graphical user interface within the scaleable application may also be migrated. Migration of the running state provides continuity for a user by allowing the current running state from the first heterogeneous device platform to be implemented on the second heterogeneous device platform. Migration of the current running state may be performed by the customizing module with the platform independent presentation model and platform specific presentations.

A first platform specific presentation for the first heterogeneous device platform may include at least one platform specific GUI widget. The current running state of the platform specific GUI widget may be obtained and used to update the running state of a corresponding platform independent GUI widget in a copy of the platform independent presentation model. The copy of the platform independent presentation model may be customized to develop a platform specific presentation for the second heterogeneous device platform. The running state of the platform independent GUI widget may be applied to a corresponding platform specific GUI widget in the second platform specific presentation. Thus, the current running state from the first heterogeneous device platform may be implemented in the running state of the second heterogeneous device platform when the scaleable application is migrated.

An interesting feature of the SGUI system involves retaining the current running state from the first heterogeneous device platform during customization of the platform independent presentation model. Customization may involve dynamically rearranging the layout of the platform independent GUI widget(s) and transforming the platform independent GUI widget(s) to other widgets compatible with the GUI of the second heterogeneous device platform. Transformation of the independent GUI widget(s) and the associated running state may be performed with the customizing module.

Other features and advantages of the invention will be apparent from the drawings and the more detailed description of the invention that follows. The foregoing discussion of the presently preferred embodiments has been provided only by way of introduction. Nothing in this section should be taken as a limitation on the following claims, which define the scope of the invention.

BRIEF DESCRIPTION OF THE DRAWINGS

FIG. 5 is an example transformation of a graphical user interface component using the scalable graphical user interface system depicted in FIG. 1.

FIG. 6 is an example transformation of a composite graphical user interface component using the scalable graphical user interface system depicted in FIG. 1.

DETAILED DESCRIPTION OF THE PREFERRED EMBODIMENTS OF THE INVENTION

Figure 1:
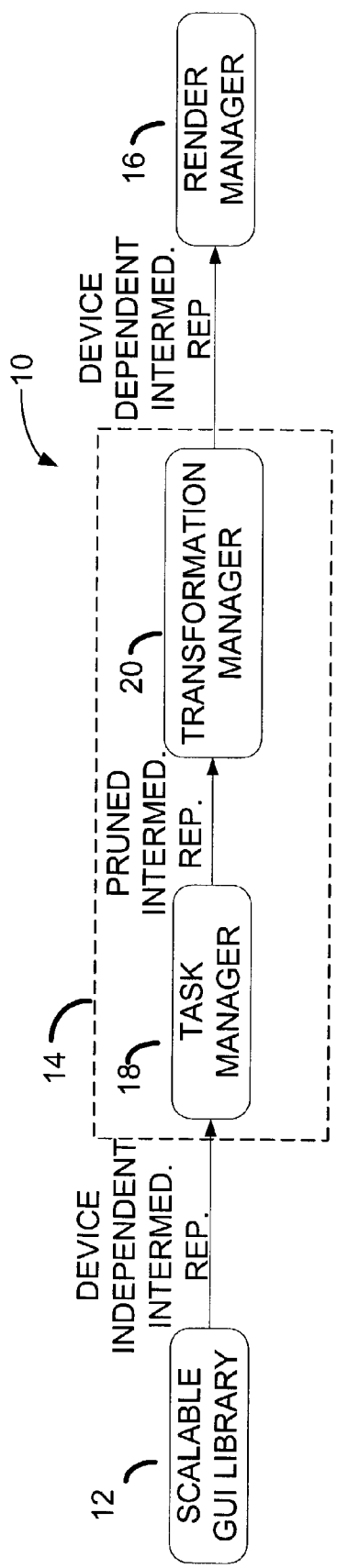
FIG. 1 is a block diagram of a scalable graphical user interface system.

The presently preferred embodiments describe a scalable graphical user interface system (SGUI) for use with scalable applications capable of operating on any of a plurality of different heterogeneous device platforms. The scalable applications may be dynamically adapted by the SGUI system to operate with a variety of user interfaces associated with the different heterogeneous device platforms. The SGUI system allows the scaleable applications to be designed with user interface capabilities that are independent of the different heterogeneous device platforms on which the scalable application may be run. Use of the SGUI system by application developers of scaleable applications may avoid many coding complexities otherwise experienced with scaling to different user interfaces associated with different heterogeneous device platforms. In addition, the SGUI system operates with different heterogeneous device platforms without the construction of models as in the model-based techniques. As such, programming by application developers is relatively less sophisticated and model building and/or model manipulation expertise is unnecessary.

Scalable applications include any applications capable of operating on different heterogeneous device platforms. Many scalable applications include the capability to generate a presentation for a display screen of one of the heterogeneous device platforms. Presentations may include one or more pages (or presentation units) of visual material. The visual material may be arranged on the display screen for user of the heterogeneous device platforms. Scalable applications may generate presentations with application GUIs. Application GUIs are the graphical user interface component of the scalable application.

The different heterogeneous device platforms may be any device that includes a display screen and the capability to run a scalable application. Example heterogeneous device platforms include wireless phones, pocket personal computers (PCs), personal device assistants (PDAs), pagers, desktop computers, notebook computers, on board vehicle computers or any other wireline/wireless device with a display screen that is capable of executing a scalable application. The heterogeneous device platforms may include an operating system such as, for example, Window NT™, Windows 2000™, Linux™, Solaris™, MacOS™, Palm™, Windows CE™, proprietary operating systems or any other operating system providing functionality to the device. The operating systems may provide capability to launch and support scalable applications.

The heterogeneous device platforms may also include any other hardware and software to provide functionality as well as operate the scaleable application. For example, the heterogeneous device platforms may include a storage mechanism such as, for example, a memory. The storage mechanism may store, for example, the operating system, scaleable applications and any other information pertaining to the device platform. In addition, the heterogeneous device platforms may include a user interface. The user interface may include, for example, a device display, a key board, a pointing device similar to a mouse, a touch screen, a keypad, audio capabilities or any other mechanism providing an interface for a user of one of the heterogeneous device platforms.

The capabilities of the heterogeneous device platforms may vary widely. As used herein, "capabilities" include those hardware features and device functionality that may impact operation of scaleable applications as well as the operation of each of the heterogeneous device platforms. Capabilities of heterogeneous device platforms may include, for example, the type of device platform (e.g. wireless phone, PDA, laptop PC, etc.), the available user interfaces library, the size of the display screen and the resolution of the display screen. Further examples of capabilities include user interfaces related to the display screen, the amount of computing power, the size of the memory, uses of the platform or any other parameters affecting the user interface and operation of a device platform.

In the presently preferred embodiments, the heterogeneous device platforms are mobile devices executing scalable applications created with Java technology. Java technology includes a Java programming language operating on a Java Virtual Machine (Java VM). The Java VM may be ported on to various device platforms. Example implementations of Java technology includes Java VM operating on a notebook PC device platform, Personal Java VM on a pocket PC device platform and Java KVM operating on a wireless phone device platform. In other embodiments, other device platforms, as well as other programming languages/technologies, may be used with the SGUI system. Other programming languages/technologies include, for example, C, C++, Microsoft™ C sharp (C##) and/or any other technologies.

The SGUI system enables scalable applications to instantiate an intermediate representation of an application GUI associated with the scalable applications. The application GUI as well as the intermediate representation are preferably non-device specific (e.g. device platform independent), but compatible with the heterogeneous device platforms. Creation of an instance of the intermediate representation in the form of a platform independent presentation model may be based on the application GUI of a scalable application. The intermediate representation may provide a logic structure for presentations generated by scalable applications. The logic structure may be customized for any of the different heterogeneous device platforms to form a platform specific presentation by the SGUI system. Customization may be based on properties specified in the application GUI as well as the capabilities of one of the heterogeneous device platforms targeted to display the presentation. More specifically, customization by the SGUI system addresses three issues common to graphical user interface development for heterogeneous device platforms, namely, display size, input methods and user interface libraries.

Display Size—A scalable application is typically capable of operation on many different heterogeneous device platforms. As such, application programmers developing scalable applications may not assume any specific size for the display screen. For example, a DOCOMO 503i wireless phone may include a 120×130 pixels display screen, a COMPAQ IPAQ Pocket PC may include a 320×240 pixels display screen, and a typical Notebook personal computer may include a 1024×768 pixels display screen. The display screen size may impact the quality of visual presentation as well as the layout of components forming pages of the presentation on the display screen.

The components forming the pages may be referred to as graphical user interface (GUI) components. GUI components are displayed features of the presentation that may be fixed, animated and/or interactive in the context of a display screen. Example GUI components include, graphical labels, graphical buttons, graphical check boxes, graphical text fields, graphical texts areas, graphical lists/tables, graphical backgrounds, data entry fields, pull down menus and/or any other features capable of display on a display screen. GUI components may be stored in a GUI library with a unique identifier. The identifier allows applications, such as, for example, the previously discussed application GUIs to build a presentation with GUI components.

Presentations may be subdivided into pages as a function of the size of the display screen. A relatively large display screen, such as, for example, the display screen of a notebook PC, may be capable of accommodating larger pages with larger size and/or larger quantities of GUI components. On the other hand, a small display screen, such as, for example, on a wireless phone, may only accommodate relatively small pages with highly compact GUI components. In addition, the smaller pages may allow fewer GUI components to be displayed at the same time on the display screen.

The SGUI system may be utilized to maximize the fill of the display screen of heterogeneous device platforms. Utilizing the intermediate representation, the SGUI system may provide dynamic layout and graphical user interface (GUI) transformation of the application GUIs. As such, the application GUIs may be scaled to the display screen of one of the heterogeneous device platforms on which the scalable application is currently operating.

Input Methods—Different heterogeneous device platforms may also include different input methods associated with the scalable application and the application GUIs. For example, a wireless phone may use a keypad as an input method, a Pocket PC may uses a stylus as an input method and a Notebook PC may use a keyboard and/or a mouse-like pointing device as an input method. Accordingly, application developers developing scalable applications may not assume specific input methods for associated application GUIs.

The SGUI system provides device platform independent GUI events that are scalable to the different heterogeneous device platforms. GUI events are changes of state within the visual material on a page. Interaction by a user with the user interface (UI) of one of the heterogeneous device platforms may result in a GUI event. The SGUI system provides dynamic translation of device platform specific GUI events to device platform independent GUI events. As such, scaleable applications utilizing the SGUI system may be designed with GUI event functionality compatible with, but independent of, the user interface of the different heterogeneous device platforms.

User Interface Libraries—Heterogeneous device platforms may also support different application program interfaces (APIs). An API is one of a collection of ready-made software components providing a wide range of functionality. For example, Java technology includes Java Application Programming Interface (APIs). Java APIs are a collection of software components providing "off the shelf" capability that may be implemented within Java based programs.

The Java platform claims to be write once, run anywhere (WORA), however, this may not be true for Java applications developed in the mobile device environment. In a wireless telephone, for example, the Java programming language may be Java 2 micro edition (J2ME). In general, the design of J2ME is based on flexibility and fragmentation. To achieve flexibility, J2ME defines device platform-specific APIs. The device platform specific APIs are referred to as a profile. The different profiles result in fragmentation since J2ME applications may be written to run only on a particular device platform. For example, a DoCoMo 503i wireless phone may support a profile of Java referred to as J2ME DoJa APIs. Similarly, a Pocket PC may support the Personal Java AWT APIs and a Notebook PC may support Java 2 standard edition (J2SE) SWING APIs.

The APIs may support different GUI libraries depending on the heterogeneous device platforms. For example, a PDA may include more touch screen related GUI components in a corresponding GUI library. On the other hand, a wireless phone, for example, may include only indication related GUI components in a corresponding GUI library. As known in the art, GUI libraries are compilations of pre-developed GUI components that may be accessed to produce a presentation The SGUI system of one embodiment provides device platform independent APIs compatible with, and supported on, different heterogeneous device platforms. The device platform independent APIs provide a bridging function to the different GUI libraries associated with different heterogeneous device platforms. Accordingly, application developers utilizing the SGUI system need not be intimately familiar with different GUI libraries to develop a platform-specific GUI presentation for each of the heterogeneous device platforms.

An example of the operation of the SGUI system is during the migration of a scalable application from one device platform to another device platform. Migration of a scalable application involves moving an instance of an operating scalable application from a source device platform to a target device platform. For example, consider a user operating a scalable application relating to email on a laptop PC in an office using a mouse/keyboard. Prior to the completing work, the user needs to leave the office. At this time, the user may migrate the still active scalable application from the laptop PC (source device platform) to a PDA (target device platform) and continue to perform email functions. Since the display screen of the laptop PC is much larger, the presentation of the application is scaled to the display screen of the PDA by the SGUI system. In addition, the user interface functionality achieved with the mouse/keyboard on the laptop PC may be scaled to the user interface functionality of a touch screen present on the PDA by the SGUI system. The SGUI system provides scalable application transferability of the user interface independent of the source and target device platforms. As such, the scalable application need only be designed to run using the SGUI system, not specifically designed to run on either of the two device platforms.

FIG. 1 is a block diagram of one embodiment of a scalable graphical user interface (SGUI) system 10. The SGUI system 10 includes a scalable GUI library module 12, a customizing module 14, and a render manager module 16 communicatively coupled as illustrated. The blocks identified in the illustrated embodiment are intended as illustrative designations to aid in understanding of the invention. These identifications are not intended to represent discrete structures. As such, fewer or additional blocks may be utilized in various embodiments to describe the functionality of the SGUI system 10.

The scalable GUI library module 12 may be a tool used by application developers during development of a scaleable application. In addition, the scalable GUI library module 12 may provide a library of GUI components for use with the intermediate representation by the SGUI system 10. In one embodiment, the device platform independent APIs may be utilized during development of scalable applications. The device platform independent APIs may be implemented by application developers within device platform independent application GUIs to build the intermediate representation. Accordingly, instantiation of an intermediate representation with device platform independent application GUIs includes execution of the device platform independent APIs within the scalable GUI library module 12. The instantiation of the intermediate representation is depicted as "Device Independent Intermed. Rep." in FIG. 1 to illustrate that the intermediate representation is a device platform independent presentation model.

In general, operation of the scalable GUI library module 12 is similar to other forms of GUI libraries, such as, for example, Java abstract window toolkit (AWT). In the presently preferred embodiments, the scalable GUI library module 12 is designed to align with the look and feel commonly found in Java GUI applications. Accordingly, the effort required by application programmers familiar with Java technology to convert existing device platform specific application GUIs utilizing device platform specific APIs into device platform independent application GUIs utilizing the device platform independent APIs within the SGUI system 10 is minimized.

The customizing module 14 operates to customize the device independent intermediate representation for a target device platform. The term "target device platform" identifies one of the heterogeneous device platforms where the scaleable application is generating a presentation for display. Generation of a presentation may occur while a scaleable application is running on a device platform identified as the target device platform. In addition, a presentation may be generated when a scaleable application is migrated from a source to the device platform that is the target of the migration (the target device platform). The customizing module 14 of one embodiment includes a task manager module 18 and a transformation manager module 20 communicatively coupled as illustrated.

The task manager module 18 of one embodiment may operate to remove tasks (functions) from the device independent intermediate representation based on the capabilities of a target device platform. The intermediate representation is depicted as "Pruned Intermed. Rep." in FIG. 1 to illustrate the removal of tasks by the task manager module 18. In one embodiment, the scalable application identifies the capabilities of a target device platform and provides the capabilities to the task manager module 18. In another embodiment, the task manager module 18 is capable of identifying the capabilities of a target device platform.

Tasks removed from the intermediate representation may include those tasks representative of functions/capabilities of a scaleable application that are not suitable for a target device platform. For example, a laptop PC does not typically utilize tasks related to telephone keypad functionality. Similarly, it may not be desirable to display all tasks on a target device platform due to constraints of the available capabilities. For example, use of a wireless telephone keypad to input large amounts of text is troublesome and time consuming. As such, the task manager module 18 may remove many of the tasks related to editing functions that are too cumbersome for a wireless telephone. In one embodiment, the task manager removes the tasks according to the capabilities of the target device platform and/or any other properties specified by application developers within the intermediate representation.

The transformation manager module 20 operates to transform the intermediate representation into a device platform dependent presentation. The device platform dependent presentation may be adapted to the particular user interface present within the target device platform. Transformation of the intermediate representation preferably occurs following removal of unsuitable tasks by the task manager module 18. Transformation of the intermediate representation involves dynamically configuring the intermediate representation based capabilities of the target device platform, the logic structure of the intermediate representation and/or properties specified by the application GUI. Following transformation by the transformation manager module 20, the intermediate representation is a platform device dependent intermediate representation depicted in FIG. 1 as "Device Dependent Intermed. Rep." to illustrate customization to a particular one of the heterogeneous device platforms (a target device platform) in the form of a platform specific presentation.

The render manager module 16 may operate to bring presentations on to the display screen of the target device platform. The render manager module 16 preferable operates following customization of the intermediate representation by the customizing module 14. The render manager module 16 may extract the presentation from the device platform dependent intermediate representation. In addition, the render manager 16 may utilize the scalable GUI library module 12 to display the presentation on a display screen of the target device platform.

Operation of the render manager module 16 includes traversing the device platform dependent intermediate representation to extract the presentation. The device platform dependent intermediate representation is actually an encoded representation of the application GUI customized to be device platform dependent for the target device platform. As such, display of the presentation extracted by the rendering manager module 16 is a display of a device dependent application GUI on the display screen of a target device platform.

The presently preferred embodiments of the SGUI system 10 may operate in conjunction with a scaleable application to provide seamless scaling of application GUIs to the capabilities of a target device platform. Application developers may use the scalable GUI library 12 as a tool to build the device platform independent intermediate representation from an application GUI. As illustrated in FIG. 1, during runtime of the SGUI system 10, an application GUI may be executed to instantiate the device platform independent intermediate representation using the scalable GUI library module 12. The customizing module 14 may customize the intermediate representation to the device dependent intermediate representation based on the target device platform the scaleable application is currently operating on. The rendering manager module 16 may utilize the device dependent intermediate representation to extract the presentation that has been customized to the user interface of the target device platform. The presentation may then be displayed on the display screen of the target device platform by the rendering manager module 16.

A more detailed discussion of the functionality of the modules illustrated in FIG. 1 will now be presented.

Figure 2:
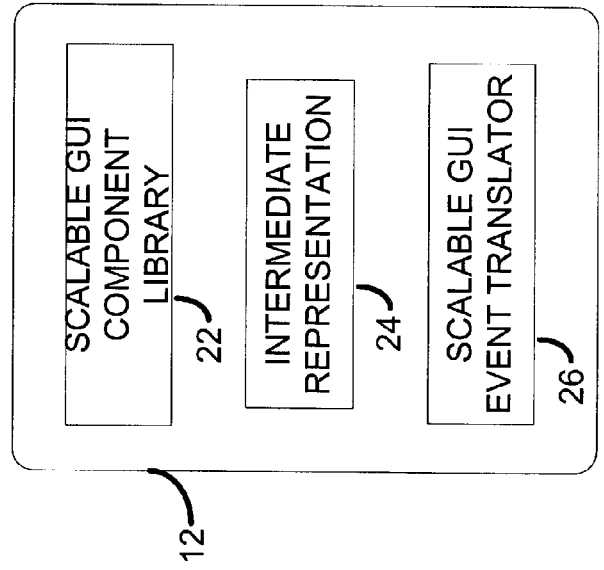
FIG. 2 is a more detailed block diagram of a portion of the scalable graphical user interface system depicted in FIG. 1.

FIG. 2 is a more detailed block diagram of one embodiment of the scalable GUI library module 12. The scalable GUI library module 12 of one embodiment includes a scalable GUI component library module 22, an intermediate representation (IR) module 24 and a scalable GUI event translator module 26. In other embodiments, fewer or more modules may represent the functionality of the scalable GUI library module 12. The scalable GUI component library module 22 may be similar in some respects to other well-known GUI component libraries. One embodiment of the scalable GUI component library module 22 includes a plurality of scalable graphic user interface (SGUI) components and the device platform independent APIs. As previously discussed, the device platform independent APIs are compatible with different heterogeneous device platforms, and are available for use in construction of device independent application GUIs.

The SGUI components are graphical user interface components within a library. The term "SGUI components" is used herein to illustrate that the graphical user interface components may be device independent graphical user interface components supported by different heterogeneous device platforms operable with the SGUI system. Further, the term "SGUI components" is used to illustrate that the graphical user interface components may be customized for the different heterogeneous device platforms. SGUI components may also be referred to as composite SGUI components. As used herein, the term "composite SGUI components" refers to multiple single SGUI components grouped to provide related functionality.

The device independent application GUIs may be used to create an instance of device independent intermediate representations that include representation of the SGUI components. Prior to producing a presentation for display, however, the intermediate representations may be transformed (or customized) such that device platform dependent presentations may be displayed.

In the presently preferred embodiments, the scalable GUI component library 22 is similar in look and feel to Java SWING. This similarity may allow application developers familiar with Java SWING to learn the scalable GUI component library 22 relatively easily. In one embodiment, the similarity with Java Swing includes the existence of a prefix of each SGUI component. In this embodiment, however, the prefix is an "S" instead of a "J" as in Java SWING.

In general, there are four well-known techniques for building cross-platform GUI libraries, namely: Least Common Denominator (LCD), Superset Emulation, Direct API Emulation and Layering/Wrapper. The LCD technique can include features that are common to all GUI libraries. The Superset Emulation technique can provide a superset of GUI components for all GUI libraries. The Direct API Emulation technique can directly map a device-specific API of one GUI library to a device-specific API of another GUI library. The Layering/Wrapper technique can provide an abstract GUI library that maps to each GUI library.

In one embodiment of the SGUI system, a combination of both Direct API Emulation and Wrapper techniques are implemented. In other embodiments, any other technique or combination of techniques may be used. It should be noted, however, that use of the LCD technique may limit the availability of SGUI components. Further, use of the Superset Emulation technique may limit scalability when the number of GUI libraries supported by the SGUI system increases.

The combination of Direct API Emulation and Wrapper techniques may be implemented with the scalable GUI component library module 22. The scalable GUI component library module 22 may be mapped to any other GUI library. In one embodiment, the scalable GUI component library module 22 is mapped to device specific GUI libraries. The device specific libraries may include, for example, Java SWING, Java AWT and/or Java DoJa. In other embodiments, the scalable GUI component library module 22 may be mapped to additional/different libraries including non-device specific libraries.

Mapping within the scalable GUI component library module 22 preferably maps SGUI components to device-specific GUI components in other libraries. This mapping may occur where corresponding device-specific GUI components are available in the device-specific GUI libraries. If device-specific GUI components are unavailable, the SGUI components may be mapped to device-specific composite GUI components in the device-specific GUI libraries. In one embodiment, the mapping is not fixed. Accordingly, in this embodiment, application developers may override the default mapping by selectively changing/adding mapping of the SGUI components within the scalable GUI component library module 22.

Referring again to FIG. 2, the intermediate representation (IR) module 24 may be any application that includes the device independent APIs used by the application GUI to build an intermediate representation. The intermediate representation represents the device independent application GUIs utilizing the scalable GUI component library module 22. In the presently preferred embodiment, the intermediate representation has a tree-like structure and may be referred to as an intermediate representation (IR) tree. In other embodiments, other structures, such as, for example, an outline structure, a matrix structure or any other relational, logic based, structure may be used to represent the intermediate representation.

The IR tree provides a logic structure in which SGUI components may be arranged. The SGUI components may be arranged by encapsulating device platform independent application GUIs in a simple intermediate representation in the IR tree. Since the application GUIs are device platform independent, the IR tree may include every possible SGUI component supported by the scalable application. The SGUI components may be arranged to provide for relatively simple transformation to device platform dependent presentations. In addition, as later described in detail, layout structures, layout constraints and other properties indicating constraints may be specified within the logic structure of the IR tree. Further, the IR tree preferably mimics the hierarchal container concept of Java technology to perpetuate similarity with Java GUI application developments.

Figure 3:
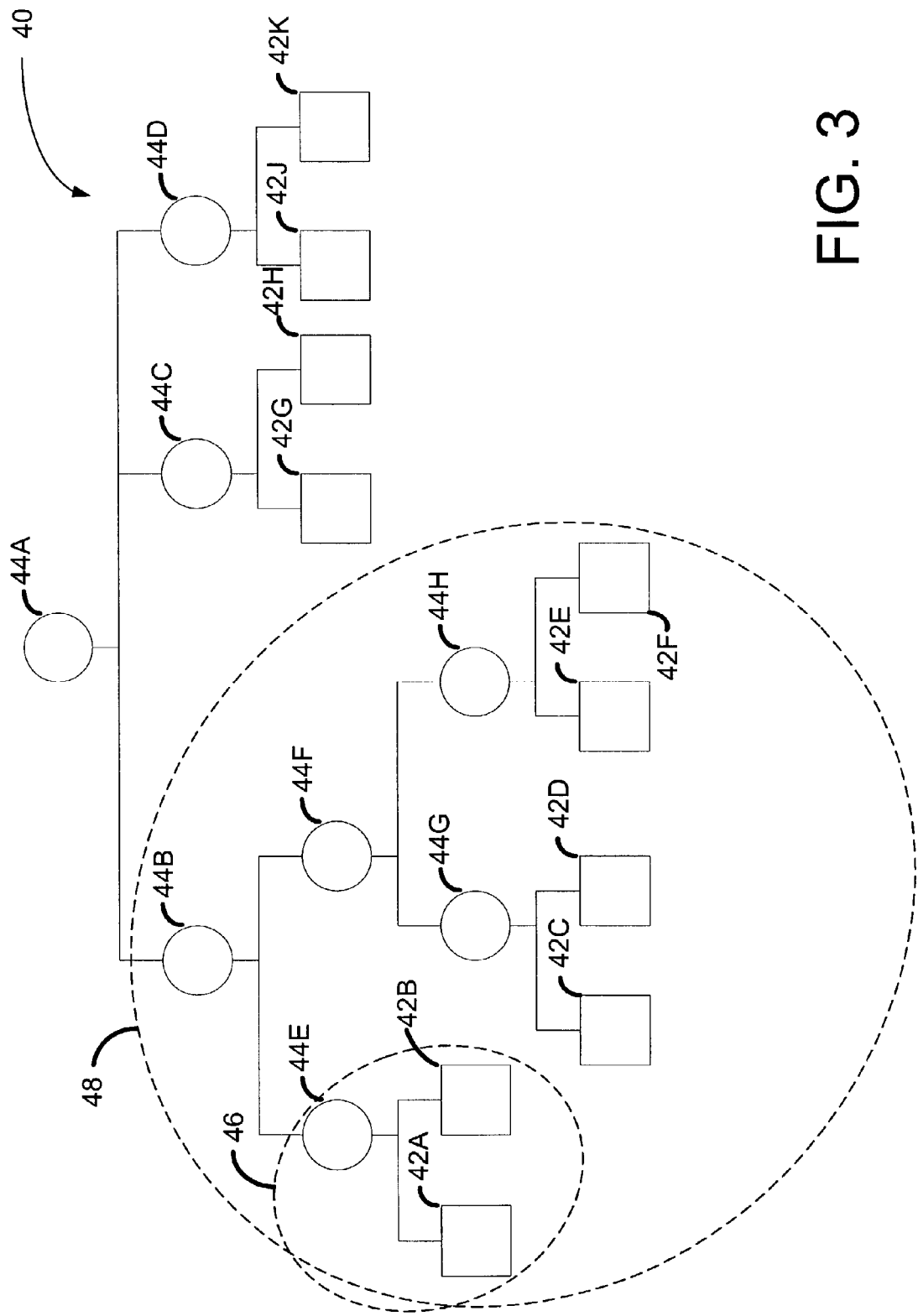
FIG. 3 is a block diagram of one example of an intermediate representation utilized by the scalable graphical user interface system of FIG. 1.

FIG. 3 is a block diagram illustrative example of the structure of an IR tree 40. The IR tree 40 comprises a plurality of interconnected nodes configured in a hierarchal structure. The illustrated hierarchal structure is just one example of any number of possible configurations. In the presently preferred embodiments, the IR tree 40 includes at least one component node 42 and at least one container node 44. In other embodiments, additional categories of nodes may be identified to represent application GUIs.

The component nodes 42 of one embodiment represent individual SGUI components. The component nodes 42 may be considered "leaves" of the IR tree 40 since there are no additional nodes of lower hierarchal position connected with the component nodes 42. The container nodes 44 of one embodiment represent logical panels within the IR tree 40. The logical panels are representative of different sections or panels within the pages of a presentation produced from the IR tree 40 for display on the display screen of a device platform. For example, within a scalable application related to email, a container node 44 may represent a window for displaying all the emails received by a user.

The container nodes 44 may have component nodes 42 and/or other container nodes 44 of lower hierarchal position connected with the container nodes 44 as illustrated. The nodes within lower hierarchical levels of the IR tree 40 represent related sub-logical panels and related SGUI components that are part of the section or panel represented by higher-level related logical panels. For example, in the window for displaying emails, a lower hierarchal level container node 44 may provide a descriptive header within the window and connected component nodes 42 may provide sorting functions for emails received.

In the example IR tree 40e illustrated in FIG. 3, root container node 44a, is in the highest hierarchal level of the IR tree 40 and may represent an entire presentation. The remaining container nodes 44 may be considered hierarchal children of root container node 44a since they represent different logical panels within the presentation. Container nodes 44c, 44d, 44e, 44g and 44h may represent the lowest level container nodes of root container node 44a. Conversely, container nodes 44b, 44c and 44d are immediate hierarchal children of root container node 44a. As further illustrated, the hierarchal children of some of the container nodes 44 are the component nodes 42. For example, the hierarchical children of container nodes 44c and 44d are component nodes 42g, 42h and component nodes 42j, 42k, respectively.

The IR tree 40 may also represent a task structure of a scalable application. The task structure may be represented by grouping SGUI components related to each task performed by the scalable application. As used herein, the term "task" identifies functions that a user of a device platform may perform with the scalable application. Functions are dependent on the device platform as well as the scalable application. For example, email capability (scalable application) on a wireless phone device (device platform) may include such tasks as viewing, deleting and creating email messages utilizing a touch screen. Accordingly, groups of SGUI components for indication and acceptance of user commands may be grouped for each function.

The task structure preferable groups SGUI components (component nodes 42) related to a specific task (function) into a logical panel (container node 44). Grouping within a container node 44 may result in the display of a task represented by the corresponding group of SGUI components on a device display of the device platform. For example, as illustrated in FIG. 3, a task 46 may include container node 44e and hierarchical children component nodes 42a and 42b. Alternatively, a task may include multiple container nodes 44 and corresponding component nodes 42.

In one embodiment, the grouping of SGUI components also allows an application GUI to specify properties to provide constraints indicating task preferences. The properties may attach certain task preferences to the corresponding container nodes 44. Task preferences may, for example, specify tasks suitable for a particular device platform, specify alternative presentations of tasks on different device platforms and/or specify any other information related to a task and/or the device platform on which the scalable application is currently operating.

As previously discussed, application developers may construct the IR tree 40 within scaleable applications during development. In addition to specifying the hierarchical structure of the container nodes and the component nodes, application developers may also specify other properties providing constraints to influence the logic structure and/or layout parameters of the IR tree 40. The properties may be specified for the component nodes 42 (SGUI components), the container nodes 44 (logical panels) and/or the IR tree 40. Creation of the instance of the IR tree 40 may include, or may occur based on, the properties specified. In the presently preferred embodiments, the specification of such properties may occur within application GUIs. In other embodiments, specification of the properties may occur elsewhere in scaleable applications, within the target device platform or within any other related device or application.

The IR tree 40 may also represent a layout structure of an application GUI within the page(s) (presentation unit(s)) of a presentation. In one embodiment, the interconnection patterns within the IR tree 40 allow a layout structure to be specified for higher-level related logical panels by immediate hierarchical children nodes. Application developers may specify properties indicating the layout structure for both component nodes 42 and container nodes 44 with the application GUI. The properties may specify the positioning of SGUI components (component nodes 42) or logical panels (container nodes 44) that are hierarchical children of a container node 44. For example, a layout structure in component node 42a may specify placement of the represented SGUI component in the upper right hand corner of the logical panel represented by container node 44e. Similarly, component node 42b may include a layout structure describing placement of the corresponding SGUI component in the upper left hand corner of the logical panel represented by container node 44e. Container node 44e may similarly include a layout structure specifying placement of the corresponding logical panel in the center of the logical panel represented by container node 44b.

As further illustrated in the example IR tree 40 of FIG. 3, a page 48 of the presentation may be formed from a hierarchically related group of container nodes 44 and component nodes 42. In the illustrated example, the page 48 is formed with container node 44b. The page 48 may result from the layout structure imposed by the related hierarchical levels below container node 44b. Specifically, properties specifying that the layout structure of component nodes 42a, 42b, 42c, 42d, 42e, 42f are within the corresponding container nodes 44e, 44g and 44h, as well as specification that container nodes 44g, 44h are within 44f, and container nodes 44e and 44f are within 44b may produce the page 46. In other embodiments, other hierarchical configurations of the nodes in the IR tree 40 in combination with specification of other layout structures may result in formation of pages.

The SGUI system may attempt to comply with the suggested layout structure when the pages of the presentation for the target device platform are created. In one embodiment, compliance with the suggested layout structure may be ignored where higher priority considerations must be implemented, such as, for example, maximizing utilization of the display screen of the target device platform.

Due to the device platform independent nature of the IR tree 40, however, variability of capabilities within different heterogeneous device platforms makes specification of such a layout structure difficult at the time an application GUI is developed. For example, the maximum allowable size of a page is dependent on the size of the display screen of a target device platform and therefore is unknown at development time. In addition, the actual size of any SGUI component is unknown at development time. The actual size is unknown, since an SGUI component may be transformed into one of many possible SGUI components of various sizes based on the capabilities of the target device platform.

In one embodiment, application developers may make a reasonable estimate of the size of an SGUI component relative to adjacently placed SGUI components within the presentation. If the estimate is accurate (close to the size of the SGUI component following transformation), large "holes" between SGUI components in the layout within the display screen of a target device platform may be avoided. In another embodiment, the SGUI system attempts to preserve the relative sizes of the SGUI components within the same container node 44 (logical panel) to avoid "holes." In still other embodiments, variability of the layout structure may be addressed by some form of automatic layout generation, customization by application developers of the layout for each target device platform and/or any other technique to address variability in the size of the SGUI components.

In addition to specification of properties indicating task preferences and layout structures, application developers may also specify additional properties providing constraints to influence the logic structure and/or layout parameters of the IR tree 40. In one embodiment, properties pertaining to a layout priority for the container nodes 44 may be specified. The properties of this embodiment identify the order in which container nodes 44 may be placed on pages. A container node 44 with the highest layout priority may have SGUI components identified by corresponding component nodes 42 located on a first page within a display screen. For example, an application developer who wishes certain tasks to be easy for the user of a device platform to locate will place a high layout priority on the corresponding logical panel(s) (container node(s) 44).

In other embodiments, properties identifying layout constraints may be included for the component nodes 42. The layout constraints may specify two or more SGUI components that must be placed adjacent to each other on the same page. For example a selectable button indicating "yes" and a selectable button indicating "no" may include layout constraints specifying that the buttons remain adjacent.

Similarly, in still other embodiments, properties may identify layout groups within the container nodes 44. The layout groups may specify if the nodes within a container node 44 may be placed on separate pages within a layout structure. In one embodiment, all container nodes 44 having component nodes 42 as immediate hierarchical children are not divisible unless specified otherwise by the layout groups. Similarly, all container nodes 44 of this embodiment that do not include component nodes 42 as immediate hierarchal children are divisible.

The properties in yet another embodiment include the ability to specify a label for the container nodes 44. The label may be associated with a logical panel and may create a navigation bar/menu within the presentation to move between pages. In other embodiments, the properties may be utilized to identify any other specifications, logic conditions and/or additional functionality related to the component nodes 42, the container nodes 44 and/or the IR tree 40.

Referring once again to FIG. 2, the scalable GUI event translator module 26 may be any technique for translating GUI events generated by the user interface of target device platforms. In one embodiment, the scalable GUI event translator module 26 includes device platform independent GUI event APIs. The device platform independent GUI event APIs process GUI events for the scaleable application. As previously discussed, a GUI event describes a change of state in an SGUI component on a display screen resulting from interaction with the user interface associated with the corresponding device platform.

In the prior art, GUI events are defined by device-specific GUI APIs. The device specific GUI APIs define the GUI events in a way that is closely tied to the device-specific input/output methods generating the GUI events. The scalable GUI event translator module 26 may be utilized to translate GUI events for heterogeneous device platforms. The scalable GUI event translator module 26 includes a device platform independent GUI event translator capable of operation with a plurality of different input methods.

In one embodiment, the GUI event translator defines an abstract event called an action. The action is independent of the input method. For example, an action associated with a GUI component operating as a button may be generated from a laptop PC mouse click, a Pocket PC stylus tap, or a cell phone soft key press depending on the device platform. Scalable applications may be provided the actions representing GUI events by the GUI event translator. As such, the input method generating a GUI event may remain transparent to the scalable application.

The scalable GUI event translator module 26 preferably includes a scalable user interface library of platform independent actions. The scalable user interface library may be included in the scalable GUI component library 22, or may be a different library. In one embodiment, the scalable GUI event translator module 26 may include logical mapping based on the device platform independent GUI event APIs. Application developers of scalable applications may utilize the device platform independent APIs for logical mapping between device platform-specific GUI events and equivalent platform independent actions. As such, platform-independent actions may be delivered to scalable applications as a result of corresponding device platform specific GUI events.

For some scalable applications, mapping between platform-specific GUI events and platform-independent actions may not be possible due to device platform constraints. For example, a scalable application may include an interactive map capable of zooming in or out when a user clicks on a specific point in the map image. On a PC, a device platform specific mouse event captures the specific location of the mouse click. A wireless phone, however, may not include a pointing input device as a user interface. As such, it may not be possible to map an equivalent platform independent action on the wireless phone. In this case, the library of the scalable GUI event translator module 26 may include device platform dependent actions for platform-specific input methods not otherwise represented by platform-independent actions. Accordingly, an application GUI may include properties to customize the GUI application for a target device platform with such constraints. In one embodiment, the device platform dependent actions may not be used to implement core features of a scalable application, since device platform-specific GUI events are generally not scalable. In this embodiment, the device platform dependent actions may be used as an optional enhancement to the core features.

Figure 4:
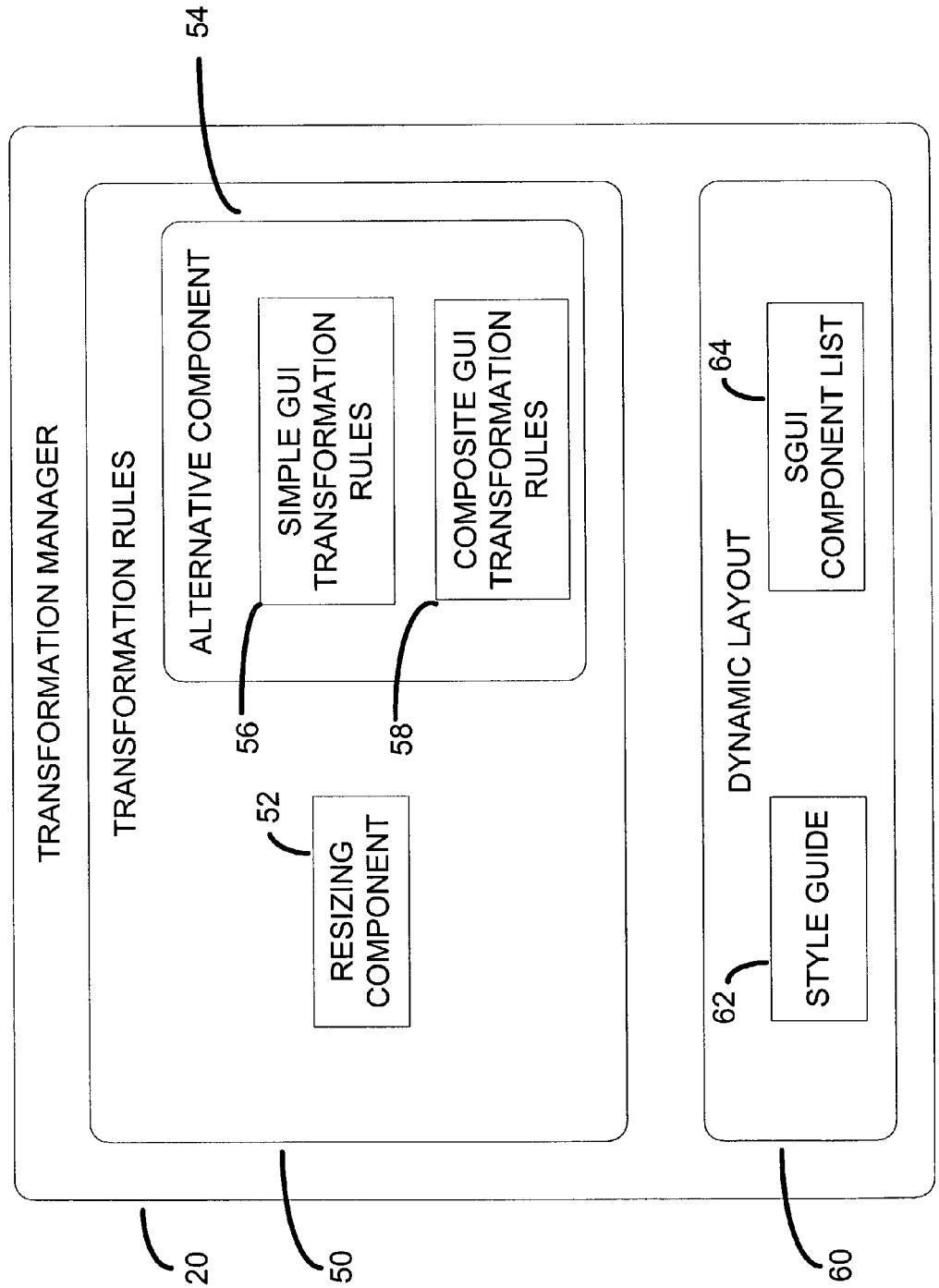
FIG. 4 is a more detailed block diagram of another portion of the scalable graphical user interface system depicted in FIG. 1.

FIG. 4 illustrates one embodiment of a more detailed block diagram of the transformation manager module 20. The transformation manager module 20 includes a transformation rules module 50, a resizing component module 52, an alternative component module 54, a simple GUI transformation rules module 56, a composite GUI transformation rules module 58, a dynamic layout module 60, a style guide module 62 and a SGUI component list module 64. In other embodiments, the functionality within the transformation manager module 20 may be represented with fewer or greater numbers of modules.

In general, the transformation manager module 50 may utilize the scalable GUI component library 22 (FIG. 2) to dynamically configure the IR tree. Dynamic configuration of the IR tree includes placing the SGUI components represented in the IR tree on a page(s) of the corresponding presentation as well as selectively transforming the SGUI components with transformation rules.

The transformation rules module 50 includes a plurality of transformation rules that may be utilized to transform the SGUI components represented in the IR tree 40 (FIG. 3). In one embodiment, the transformation rules module 50 includes the resizing component module 52 and the alternative component module 54 representing two general categories of transformation rules. The resizing component module 52 may provide rules to adjust the size of the SGUI components based on the size of the display screen of a target device platform. The alternative component module 54 may identify alternative SGUI components to replace those SGUI components representing the application GUI in the IR tree.

The alternative component module 54 of one embodiment includes the simple GUI transformation rules module 56 and the composite GUI transformation rules module 58 illustrating two categories of rules for alternative SGUI components. The simple GUI transformation rules module 56 provides rules to transform SGUI components into SGUI components specific to the target device platform.

FIG. 5 illustrates an example of transformation with a transformation rule from a first SGUI component 70 to a second SGUI component 72 that is specific to the target device platform. SGUI components may be identified as specific to the target device platform based on the capabilities of the target device platform, the type of target device platform, the user interface of the target device platform, the functionality of the scaleable application and/or any other parameters related to display of SGUI components.

In the illustrated example, the first SGUI component 70 represents a priority selection list in which "high," "medium," or "low" priority may be selected by a user. Similarly, the second SGUI component 72 represents a priority selection button. If, for example, the IR tree 40 (FIG. 3) included a component node 42 (FIG. 3) for the first SGUI component 70 and the target device platform was a PDA, the simple GUI transformation rules module 56 (FIG. 4) may provide a transformation rule to transform the first SGUI component 70 to the second SGUI component 72 as illustrated by arrow 74.

The second SGUI component 72 of this example may be identified as specific due to the limited size of the display screen of the PDA, the user interfaces available on the PDA, or any other reasons related to the PDA or the scaleable application. This illustrative example is one of an almost infinite number of transformation rules that may be applied to SGUI components.

Referring again to FIG. 4, the composite GUI transformation rules module 58 provides transformation rules to transform composite SGUI components into composite SGUI components specific to a target device platform. As previously discussed, composite SGUI components may be represented by container nodes 44 (FIG. 3) and corresponding components nodes 42 (FIG. 3) in the IR tree 40 (FIG. 3). FIG. 6 illustrates an example transformation of a first composite SGUI component 76 to a second composite SGUI component 78 that is specific to a target device platform.

In the illustrated example, the first composite SGUI component 76 represents a plurality of data entries 80, a priority selection 82 and a preference selection 84. The second composite SGUI component 78 includes a pick list 86 and a single data entry 88. Similar to the example discussed with reference to FIG. 5, a transformation rule available from the composite GUI transformation rules module 58 may be used to transform the first composite SGUI component 76 to the second composite SGUI component 78 as illustrated by arrow 90.

Referring once again to FIG. 4, the dynamic layout module 60 may dynamically configure the IR tree to represent a device platform dependent presentation. Dynamic configuration involves placing the SGUI components represented by the IR tree in a page(s) of a presentation and selectively transforming SGUI components. In one embodiment, the SGUI components represented by the IR tree may be placed onto pages according to the layout structure and other constraints specified by the application GUI. In addition, the dynamic layout module 60 may compare the presentation to the capabilities of the target device platform to confirm compatibility. For example, one capability related constraint may be the size of the page(s) of the presentation. The size of the page(s) configured by the dynamic layout module 60 should not exceed the size of the display screen of the target device platform that will display the presentation. Other examples of capability related constraints may be a minimum viewable size of the SGUI components or any other capability related to a target device platform.

The dynamic layout module 60 may select and apply transformation rules available from the transformation rules module 50 to transform the SGUI components into compliance with the capabilities/constraints. For example, to meet the constraint of the size of the display screen, the dynamic layout module 60 may apply transformation rules to SGUI components in the IR tree to create a more compact presentation. Selection of the transformation rules may be a result of the scaleable application, the size of the display screen of the target device platform, the user interface capability of the device platform and/or any other parameters related to display and interaction with the target device platform.

In one embodiment, the dynamic layout module 60 may generate a page(s) for a presentation based on the capabilities/constraints. In another embodiment, the result of apply the transformation rules is the generation of a set of proposed pages of various configurations that are specific to the target device platform. Each of the proposed pages in the set is part of a possible device platform dependent presentation. Based on the proposed page(s) developed within each possible presentation, the dynamic layout module 60 may selectively utilize pages from within the set to obtain the most desirable device platform dependent presentation. Desirable features may include, for example, minimizing the number of pages, complying with properties specified by the application GUI, maximizing utilization of the display screen for each page, and/or any other characteristics associated with the presentation, the target device platform and/or the scaleable application.

As further illustrated in FIG. 4, the dynamic layout module 60 of this embodiment includes the style guide module 62 and the SGUI component list module 64. In other embodiments, additional or fewer modules may be identified within the dynamic layout module 60 to illustrate functionality.

The style guide module 62 may provide at least one set of style guide parameters for application to the SGUI components. The style guide parameters may standardize the visual appearance of the SGUI components to provide a consistent appearance within a presentation. Examples of style guide parameters include font sizes, spacing between components, colors, etc. In one embodiment, a single set of style guide parameters is used for all device platforms. In another embodiment, sets of style guide parameters may be associated with one or more target device platforms.

The SGUI component list module 64 may compile a list of possible SGUI components. The list of possible SGUI components may represent SGUI components resulting from transformation of one of the SGUI components represented in the IR tree. The dynamic layout module 60 may apply transformation rules to each SGUI component represented in the IR tree to generate the list. In one embodiment, the list of SGUI components may be compiled by the SGUI component list module 64 according to the size of each SGUI component in the list.

The dynamic layout module 60 may selectively apply appropriate transformation rules from the transformation rules module 50 to generate the list of SGUI components. In one embodiment, a rule-based technique may be utilized by the dynamic layout module 60 for selection of appropriate transformation rules. The technique may involve selectively applying transformation rules based on two preconditions. The first precondition may involve consideration of characteristics of the SGUI component to be transformed. The second precondition may involve consideration of the capabilities of the target device platform targeted for the presentation.

In addition to the preconditions, in one embodiment, selection of appropriate transformation rules may also involve ranking by the dynamic layout module 60. Ranking of the transformation rules may be based on the results of applying each of the transformation rules. For example, ranking may be based on how likely a transformation rule is to produce a reasonable translation for different scaleable applications. Those transformation rules with greater success are ranked highly and those that are more specific to a particular scaleable application may be ranked lower. For example, the transformation of a selection list (with a small number of selectable items) to a choice button (see FIG. 5) may be universally applied in many scaleable applications; hence a high ranking may be assigned.

Following generation of the list of SGUI components, the dynamic layout module 60 may selectively choose SGUI components from the list for use in the presentation. In one embodiment, selection of the SGUI components is based on maximizing the fill of a display screen. In other embodiments, other conditions, such as for example, capabilities of the target device platform, the scaleable application and/or any other conditions may be used in the selection process. The SGUI components may be selected from the list and placed on page(s) representative of the presentation. The SGUI components selected from the list may replace the SGUI components used to generate the list. This interchange of SGUI components effectively transforms a device platform independent SGUI component into an SGUI component specific to the target device platform.

In one embodiment, each of the pages maybe compared with the size of the display screen to maximize fill. In this embodiment, depending on whether reduction or enlargement of the SGUI components making up the page is needed, the dynamic layout module 60 may select larger or smaller size SGUI components from the list. In one embodiment, where there are a number of similarly sized SGUI components in the list corresponding to one of the SGUI components, the selection may be further based on the previously discussed ranking of the transformation rules used to create the SGUI components in the list.

In the presently preferred embodiments, the dynamic layout module 60 may iteratively proceed through the IR tree to create a page(s) associated with the presentation. In one embodiment, the iterative process by the dynamic layout module 60 proceeds from the lowest hierarchical levels of the IR tree toward the higher levels. The dynamic layout module 60 may iteratively add logical panels to a page of the presentation to fill the page. When a page is under filled, a hierarchically related logical panel from a sibling, or higher-level related node, may be added to the page. For example, referring to FIG. 3, container nodes 44h, 44f and 44e may be iteratively added to container node 44g to create the page 48. Conversely, when a page is overfilled, transformation of the SGUI components within the page may be performed to reduce the fill to comply with the size of a display screen.

When a page is substantially full, a new page of the presentation may be similarly produced. A "substantially full" page maximizes the fill of the display screen of the target device platform with the available SGUI components. In one embodiment, a page occupying between about 95%-100% of the display screen of a target device platform is substantially full. The layout structure, the other specified constraints and/or the SGUI components may prevent the display screen from being completely full; however, a substantially full page maximizes the fill under the present conditions.

Figure 7:
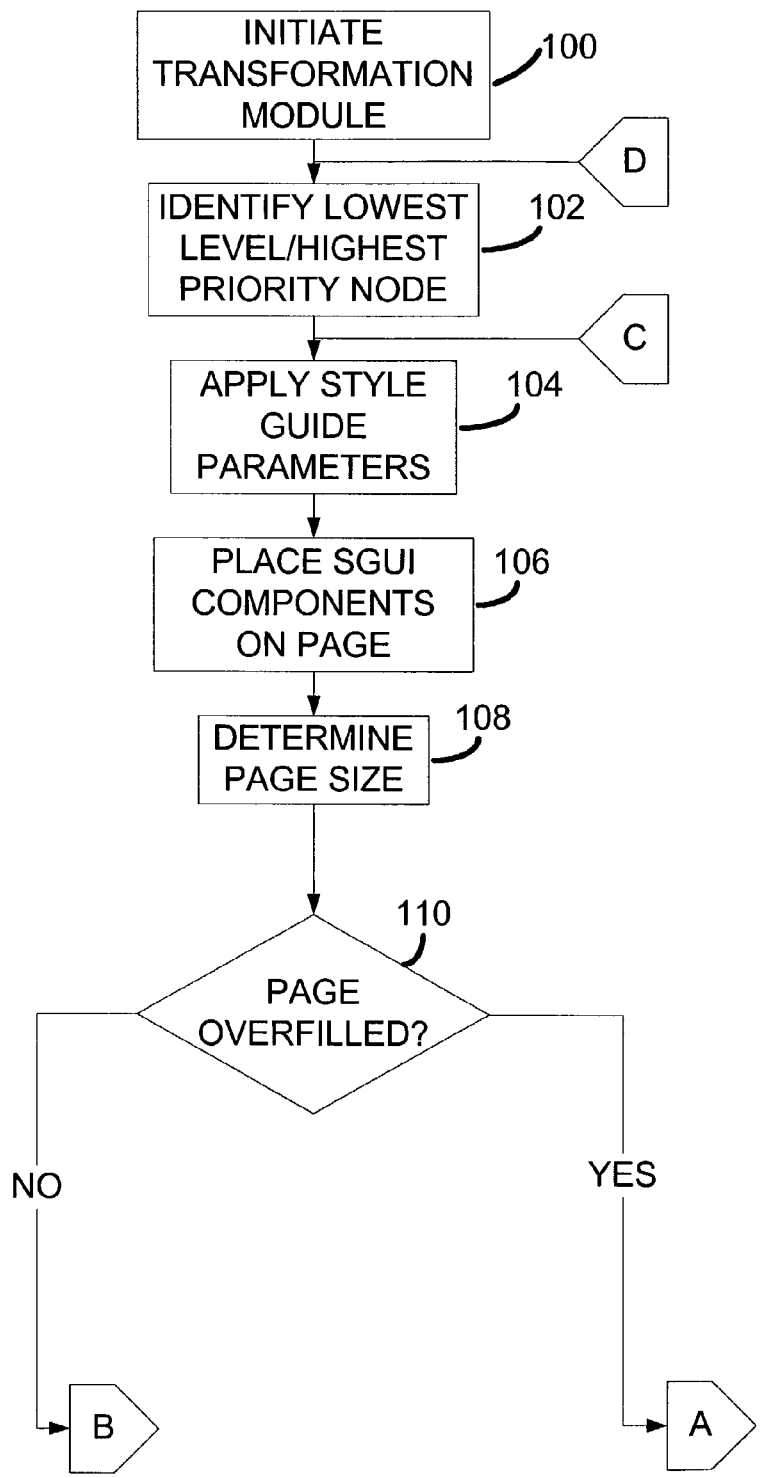
FIG. 7 is a flow diagram illustrating operation of the scalable graphical user interface system illustrated in FIG. 1.

FIG. 7 is a block diagram illustrating operation of one embodiment of the transformation module 20 illustrated in FIG. 4 with reference to the example IR tree 40 illustrated in FIG. 3. Operation of the transformation module 20 is initiated at block 100. Initiation of the transformation module 20 preferably occurs following instantiation and pruning of the IR tree 40. At block 102, the lowest-level container node 44 with the highest layout priority in the IR tree 40 is identified. The lowest-level container node(s) are those with hierarchal children nodes representative of SGUI components (component nodes 42). In the example IR tree 40 of FIG. 3, container nodes 44c, 44d, 44e, 44g and 44h are the lowest-level container nodes. The layout priority may be identified by properties of the application GUI. For purposes of illustrating operation, container node 44g of FIG. 3 has been identified as having the highest layout priority.

The style guide module 62 applies the set of style guide parameters corresponding to the target device platform to SGUI components (component nodes 42c and 42d) associated with the identified container node (container node 44g) at block 104. At block 106, the SGUI components are placed on a page of a presentation in accordance with the layout structure of the IR tree 40 and constraints specified by the application GUI. The size of the page is determined at block 108. At block 110, it is determined if the page is over filled. The page is over filled if the size of the page is bigger than the size of the device display of the target device platform.

Figure 8:
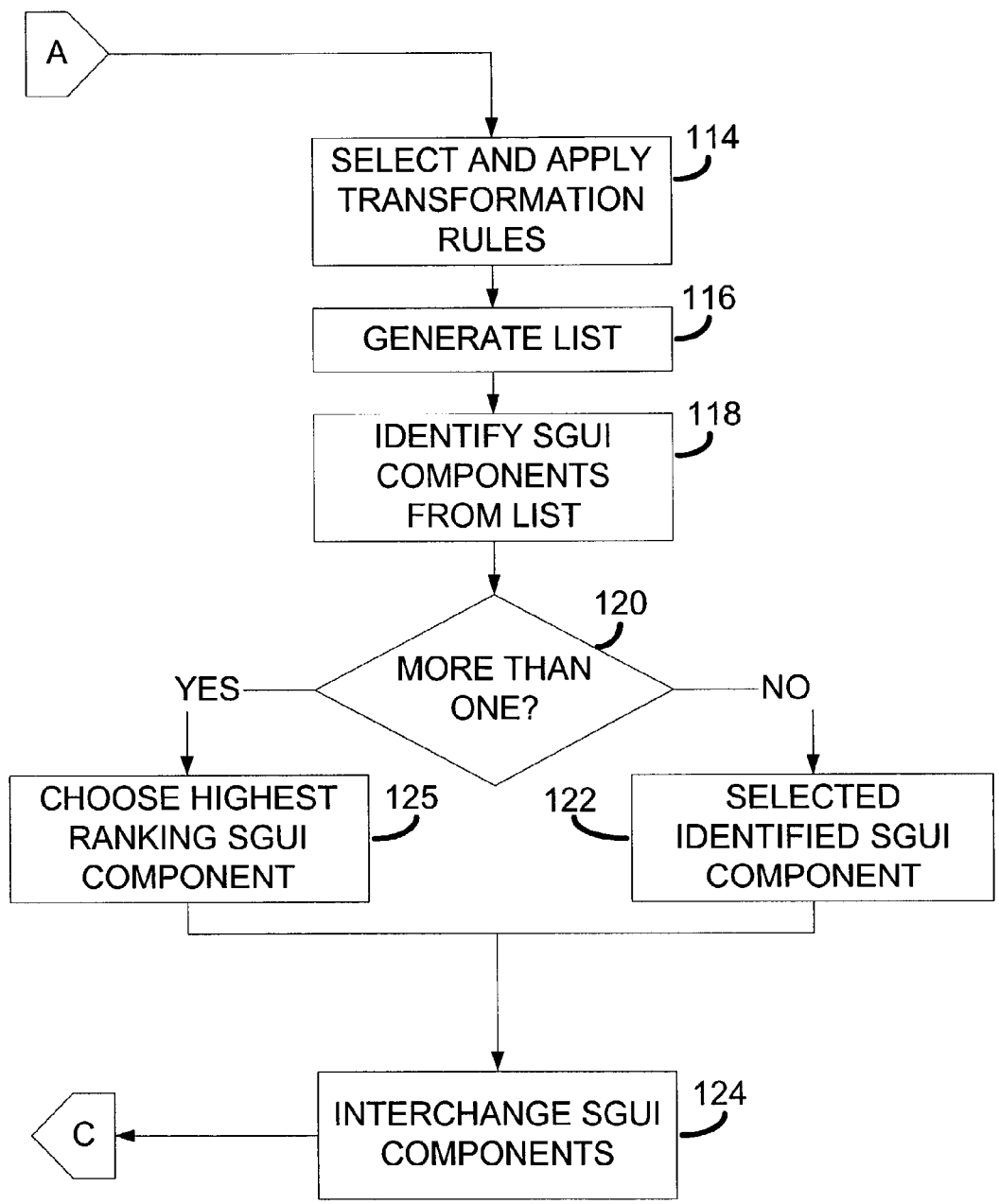
FIG. 8 is second portion of the flow diagram illustrated in FIG. 7.

Referring now to FIG. 8, if the page is over filled, at block 114, appropriate transformation rules are selected and applied to each of the SGUI components by the dynamic layout module 60. Lists of possible SGUI components are created and compiled according to size with the SGUI component list module 64 at block 116. At block 118, SGUI components are identified from the list based on conditions, such as for example, the amount of size reduction needed. At block 120, it is determined if more than one SGUI component in the list has been identified. If no, the identified SGUI component is selected at block 122. At block 124, the selected SGUI component is interchanged with the corresponding SGUI component previously represented in the page (at block 106), and the operation returns to block 104 (FIG. 7). If multiple SGUI components have been identified, the SGUI component created from the highest ranked transformation rule is selected at block 125 and the operation proceeds to block 124.

Figure 9:
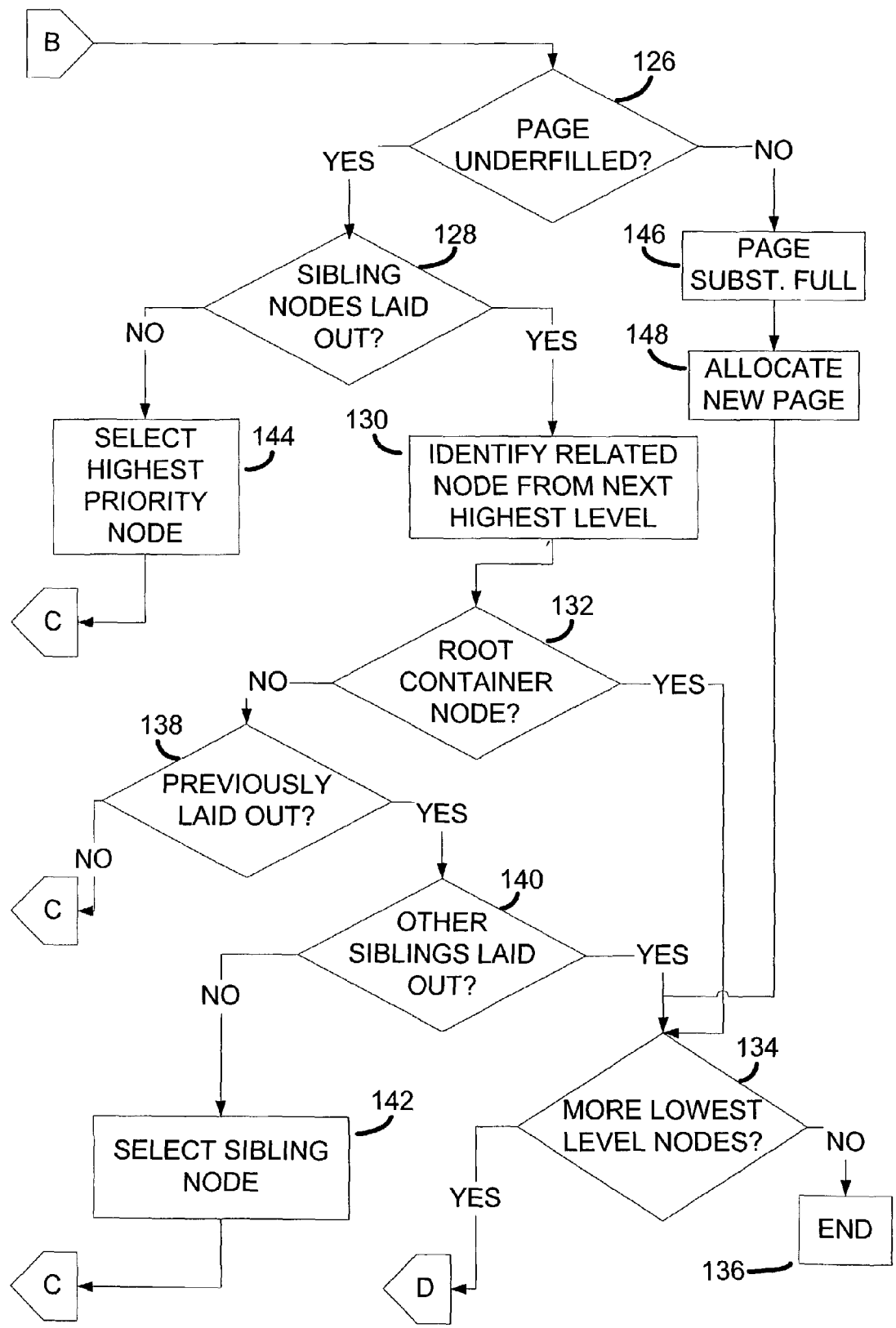
FIG. 9 is a third portion of the flow diagram illustrated in FIG. 7.

Referring now to FIG. 9, if the page is not over filled at block 110 (FIG. 7), determination of whether the page is under filled occurs at block 126. The page is under filled when the size of the page is smaller than the size of the display screen of the target device platform. If the page is determined to be under filled, identification of any sibling nodes (container node 44h of FIG. 3) not yet laid out on a page occurs at block 128. If such sibling nodes are not laid out, the identified sibling node of highest priority is selected at block 144 and the operation returns to block 104 (FIG. 7) to begin processing the selected node. If the sibling nodes are already laid out (or non-existent), a related node from the next highest hierarchal level (container node 44f of FIG. 3) is identified at block 130.

At block 132, the node from the next higher hierarchal level is checked to determine if it is the root container node (container node 44a in FIG. 3). If yes, the IR tree is checked for additional lowest level container nodes not already laid out on a page at block 134. If such additional lower level container nodes exist, the operation returns to block 102 (FIG. 7) to identify another container node 44 (FIG. 3) at the lowest level and the next highest priority. If additional lower level container nodes do not exist, the operation ends at block 136.

Returning now to block 132, if the node in the next higher hierarchal level (container node 44f of FIG. 3) is not the root container node (container node 44a of FIG. 3), it is determined if the node has been previously laid out in a page at block 138. If the node was not previously laid out, the operation returns to block 104 (FIG. 7) to begin processing the node. If the node was previously laid out, it is determined if sibling nodes (container node 44e of FIG. 3) of the node in the next higher hierarchical level have not been laid out at block 140. If the siblings nodes have already been laid out in a page (or do not exist), the operation returns to block 134. If sibling nodes have not yet been laid out, the sibling node with the highest layout priority is selected at block 142 and the operation returns to block 104 (FIG. 7) to begin processing the selected node.

Returning now to block 126, if the page is not under filled, the page is considered substantially full at block 146. At block 148, a new page is allocated for laying out the remaining SGUI components and the operation returns to block 134.

In another embodiment, upon determining the page is full, additional operations may be performed to generating additional variations of the same page with alternative SGUI components from the list. Following these additional operations, the dynamic layout module 60 may select the most desirable device platform dependent presentation as previously described.

Figure 10:
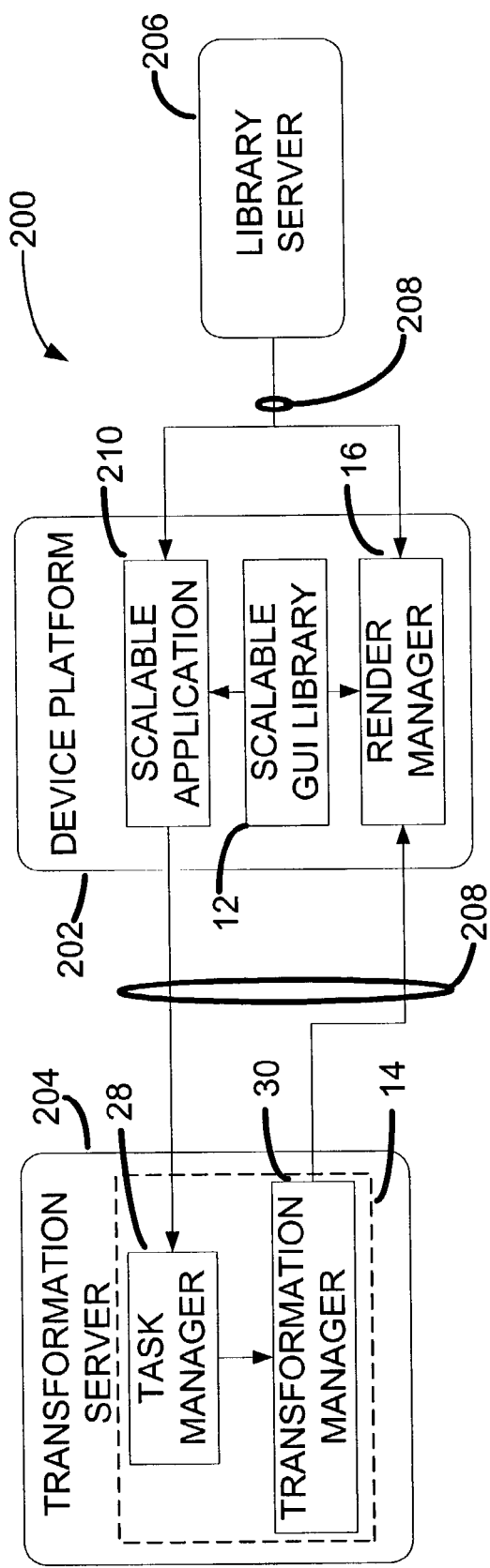
FIG. 10 is one example of a communication system that includes devices operating with the scalable graphical user interface system depicted in FIG. 1.

An example of utilization of the SGUI system within a communication system will now be described. FIG. 10 is an example of a communication system 200 that includes a device platform 202, a transformation server 204 and a library server 206 in operable communication over a network 208. The device platform 202 may be any of the previously described heterogeneous device platforms. The transformation server 204 and the library server 206 may be any device performing a server function within the network 208. In one embodiment, one or more server computers that include an operating system operate as the transformation server 204 and the library server 206. Example operating systems include Microsoft™ Windows NT™, UNIX™ or any other operating system capable of supporting server functionality. The servers 204, 206 may include the ability to store and access data as well as execute applications, such as, for example, portions of the SGUI system. The network 208 may include the Internet, a public or private intranet, an extranet and/or any other form of network configuration to enable transfer of data and commands via wireless, fiber optic and/or wireline communications.

The SGUI system is operable within the communication system 200. In one embodiment, a scalable application 210 may be operated on the device platform 202. In addition, the scalable GUI library module 12 and the render manager module 16 may operate on the device platform 202. Further, in this embodiment, the task manager module 18 and the transformation manager module 20 may operate within the customizing module 14 on the transformation server 204. The scalable application 210, the scalable GUI library module 12, the customizing module 14 and the render manager module 16 operate similarly in this embodiment as in the previously discussed embodiments.

Different functionality within the SGUI system as well as the scalable application may be distributed among different device platforms and servers in other embodiments. For example, where sufficient capabilities exist to support such operation, the entire SGUI system and scalable application 210 may be operating on the device platform 202. In another example, portions of the SGUI system and the scalable application 210 may be operated on the device platform 202 and other portions of the SGUI system and the scalable application 210 may be operated on other device platforms. In yet another example, the majority of the SGUI system may operate on a server or other similar device and only the essential components of the SGUI system may operate on the device platform 202.

In one embodiment, the entire scalable GUI component library 22 (FIG. 2) within the scalable GUI library module 12 may be stored in the device platform 202. In this embodiment, the transformation server 204 may access the scalable GUI component library via the network 208. As previously discussed, the transformation manager 20 may access the scalable GUI component library during transformation of the SGUI components.

In another embodiment, a portion of the scalable GUI library module 12, along with a subset of the scalable GUI component library 22 may be stored in the device platform 202. Storage of the scalable GUI component library 22 may be limited to a subset because of; for example, limited storage capability of the device platform 202, gains in retrieval response and/or any other reasons related to operation of the device platform 202 and/or the scaleable application 210. The subset of the scalable GUI component library 22 may include SGUI components frequently used by the device platform 202. In this embodiment, a portion of the scalable GUI library 12 along with the entire scalable GUI component library 22 (FIG. 2) may be stored on the library server 206 and accessed over the network 208 by the device platform 202 as needed. The customizing module 14 may also access either the subset of the scalable GUI component library 22 in the device platform 202 and/or the entire scalable GUI component library 22 in the library server 206. In another embodiment, the transformation server 204 may store the entire scalable GUI component library 22 for access by the device platform 202, as well as the transformation server 204.

In yet another embodiment, the transformation server 204 may include a portion of the scalable GUI library 12. Portions of the scalable GUI library 12 may be included in the transformation server 204 due to, for example, limited computing power in the device platform 202, the desire to conserve the resources of the device platform 202 or any other reasons related to operability of the SGUI system. In one embodiment, a portion of the intermediate representation module 24 (FIG. 2) may be included in the transformation server 204. The portion of the intermediate representation module included in the transformation server 204 may operate to create an instance of the IR tree based on mobile code. In this embodiment, mobile code may be transmitted from the application GUI of the scaleable application 210 over the network 208 to the transformation server 204. The portion of the intermediate representation module may execute the mobile code to create an instance of an IR tree representative of the application GUI.

Figure 11:
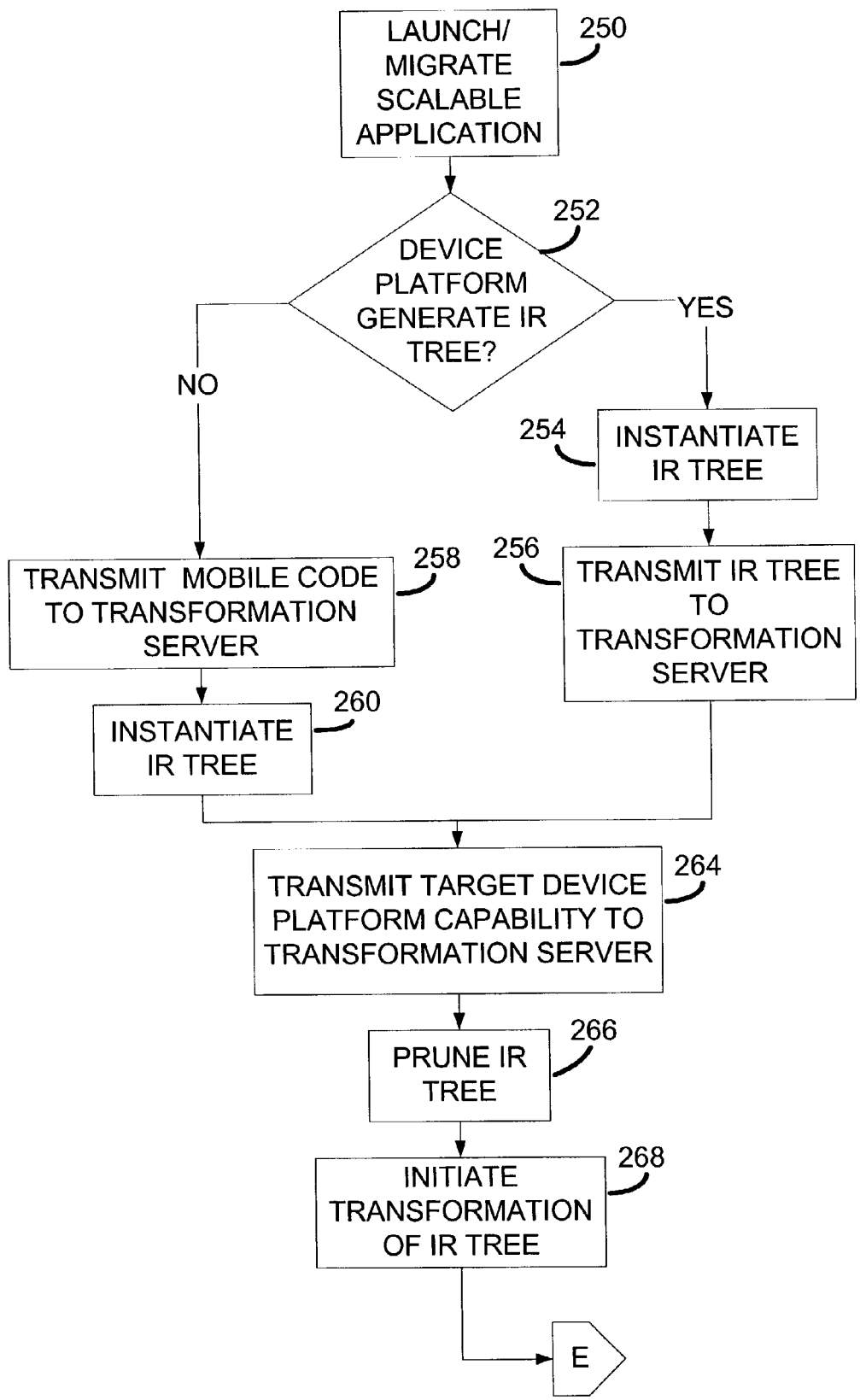
FIG. 11 is a flow diagram illustrating operation of the scalable graphical user interface system within the communication system illustrated in FIG. 10.

FIG. 11 is a block diagram illustrating operation of one embodiment of the SGUI system discussed with reference to FIG. 10. Operation begins at block 250 when a scalable application 210 is migrated to, or launched from, a target device platform (the device platform 202). At block 252, the scalable application 210 determines if an instance of the IR tree will be created on the target device platform. If yes, the application GUI within the scalable application 210 is utilized in conjunction with the scalable GUI library 12 to create an instance of the IR tree at block 254. At block 256, the IR tree representing the application GUI may be transmitted to the transformation server 204. If the instance of the IR tree is not created on the target device platform, the mobile code is transmitted to the transformation server 204 at block 258. The transformation server 204 executes the mobile code at block 260 to create an instance of the IR tree representing the application GUI. As previously discussed, the IR tree is device platform independent and includes properties specified by the application GUI.

At block 264, the capability of the target device platform is transmitted to the transformation server 204. The task manager module 18 prunes unnecessary logical panels and/or SGUI components from the IR tree as a function of the capability of the target device platform at block 266. At block 268, the transformation manager module 20 receives the IR tree from the task manager module 18 and initiates the transformation of the IR tree. Transformation of the IR tree involves dynamically configuring the SGUI components represented in the IR tree. The IR tree is transformed to develop the layout of the device platform dependent presentation.

Figure 12:
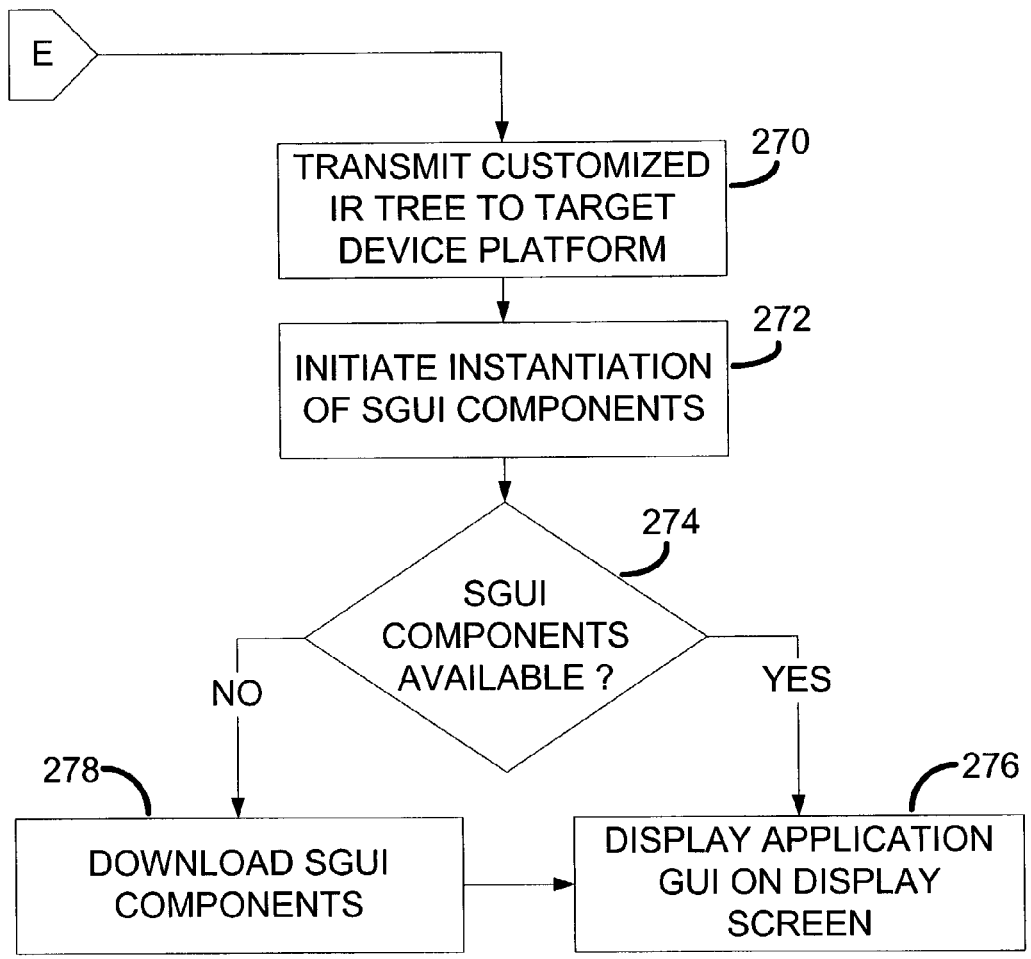
FIG. 12 is a second portion of the flow diagram illustrated in FIG. 11.

Referring now to FIG. 12, following transformation, the device dependent IR tree is transmitted to the target device platform at block 270. At block 272, the render manager module 16 begins the process of traversing the device dependent IR tree and instantiating the SGUI components. The render manager module 16 determines if each of the SGUI components is stored in the scalable GUI component library 12 within the target device platform at block 274. If yes, the render manager module 16 directs the display of the now customized application GUI on the display screen of the device platform 202 at block 276. If the SGUI components are not stored in the scalable GUI component library 22 within the device platform 202, the render manager module 16 dynamically downloads the SGUI components from the library server 206 to the device platform 202 at block 278. The render manager module 16 then directs the display of the now device dependent application GUI on the display screen of the device platform 202 at block 276.

Figure 13:
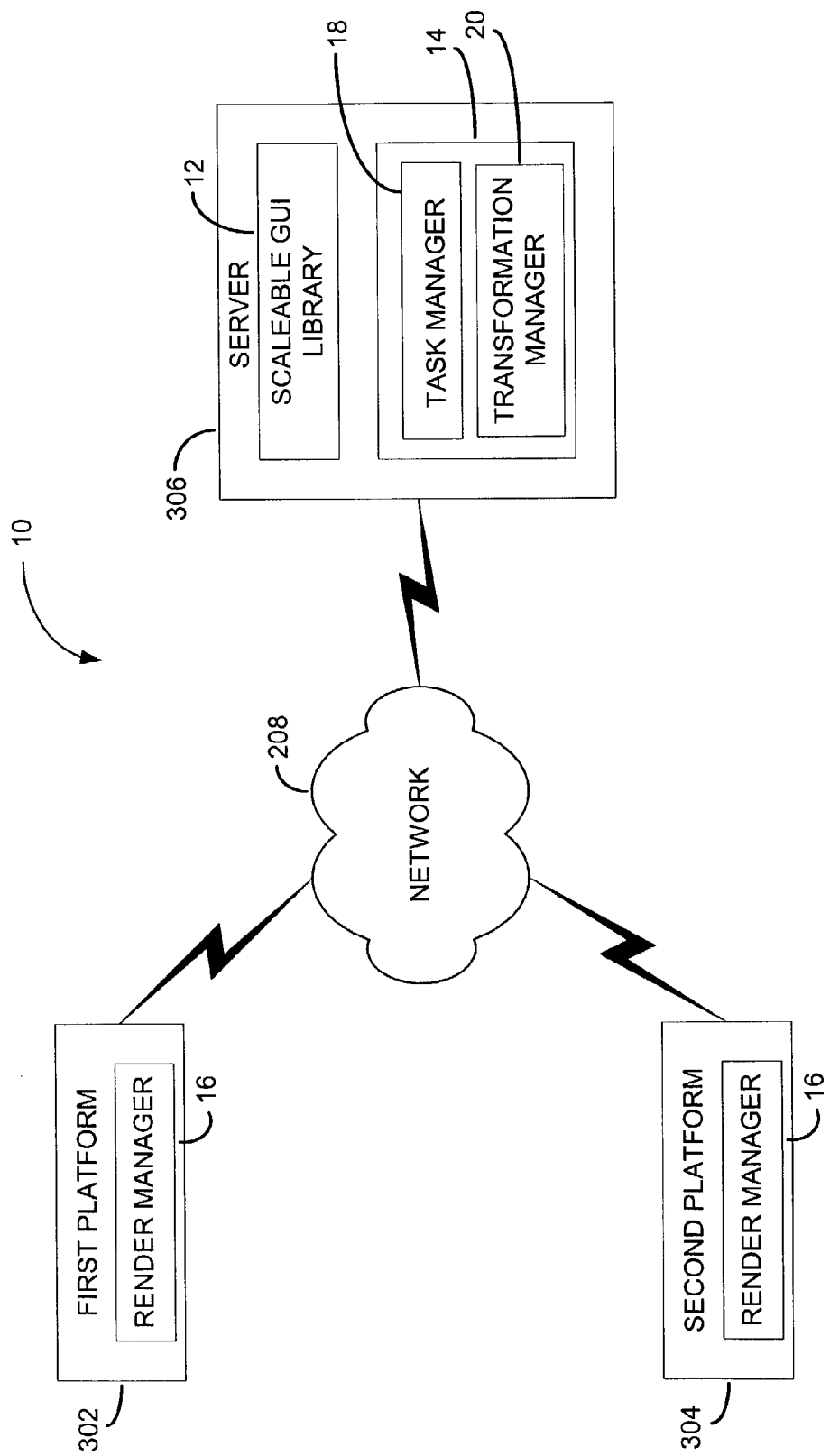
FIG. 13 is another example of a communication system that includes devices operating with the scalable graphical user interface system depicted in FIG. 1.

In addition to providing features available to a user prior to a GUI migration event, the SGUI system 10 may also be capable of maintaining the running state of application GUIs migrated from a first heterogeneous device platform to a second heterogeneous device platform. The running state as used herein refers to changes made by an end user of a scaleable application that affect the SGUI components. The changes may include SGUI component variables such as appearance, data entry, state changes, etc. FIG. 13 is a block diagram of an example communication system operating with an embodiment of the SGUI system 10 that includes a first heterogeneous device platform 302, a second heterogeneous device platform 304 and a server computer 306. In other examples any number of platforms and servers may be utilized.

The first and second platforms 302, 304 may be any of the previously described heterogeneous device platforms and may each include the render manager module 16. The server 306 may be similar to any of the previously described computing devices and may include the scalable GUI library 12 as well as the task manager module 18 and the transformation manager module 20 within the customizing module 14 as previously discussed. In other examples, the modules may be distributed differently among the devices in the communication system depending on such variables as the computing capability of the devices, configuration of the network 208, provider preferences, etc. Communication between the first platform 302, the second platform 304 and the server 306 may be over the previously discussed network 208.

As previously described, a device platform-independent (PI) intermediate representation may be developed by application developers as part of developing scalable applications. The platform independent intermediate representation may be stored in the form of a platform independent presentation model. The platform independent presentation model may be stored in the server 306, the first platform 302, the second platform 304 or in any other device in communication with the network 208.

In this embodiment, the layout of the device platform independent intermediate representation may be specified based on a heterogeneous device platform with the largest display screen and most extensive user interface mechanism(s) that application developers anticipate the scaleable application will be operated with. For example, the platform independent intermediate representation may be specified based on operation with a laptop computer with a large display screen and multiple user interfaces, such as touch screen, mouse, keyboard, etc. Accordingly, platform specific presentations generated from the platform independent presentation model may be the same size or smaller than the platform independent presentation model.

Figure 14:
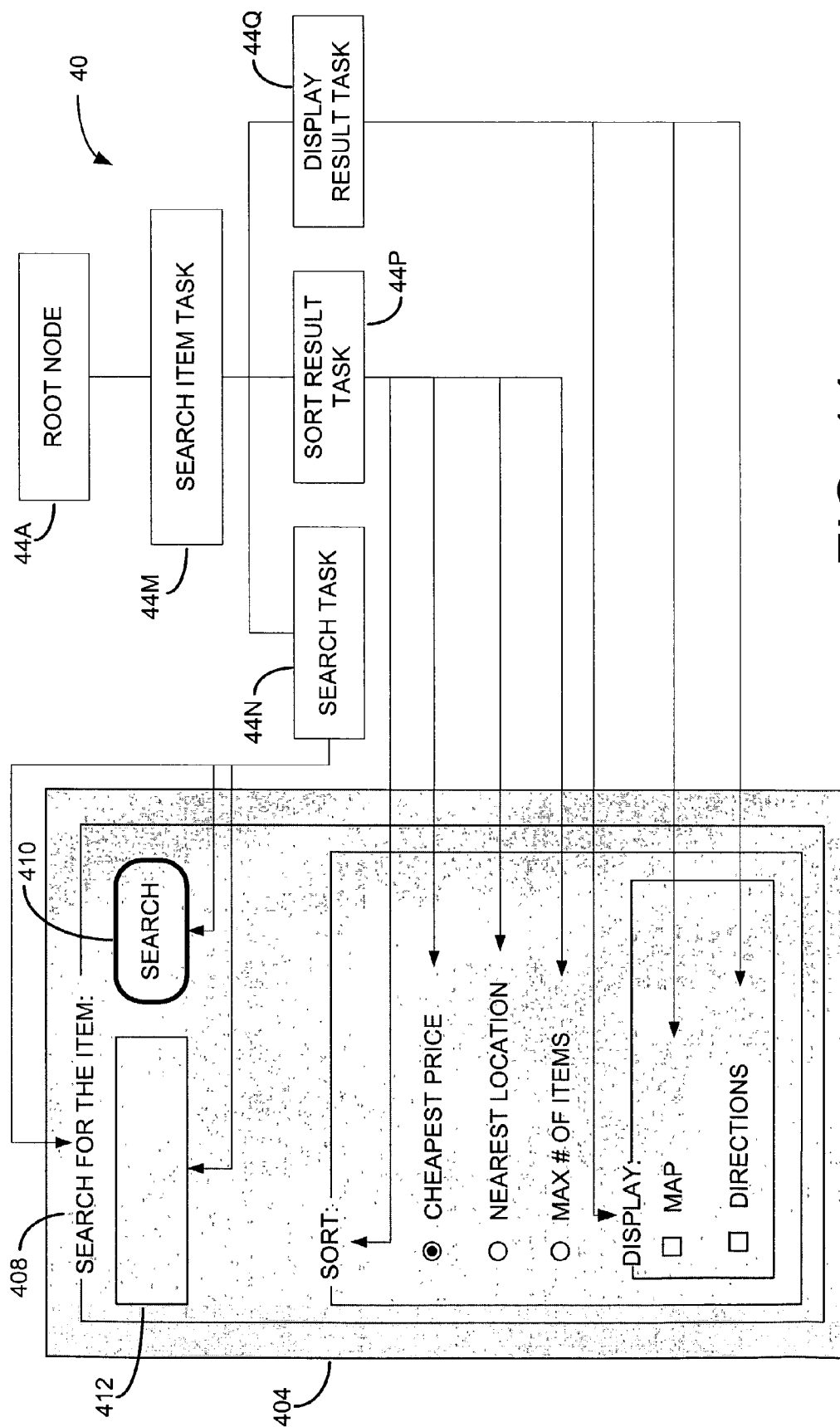
FIG. 14 is an example platform independent presentation model utilized by the scalable graphical user interface system.

FIG. 14 is an example of a platform independent presentation model for a scaleable search item application in the form of an IR tree 40 and a corresponding GUI presentation 404. As previously discussed, the root node 44a may occupy the top of the IR tree 40 and represent the GUI presentation. Child nodes of the root node 44a are container nodes 44 or "task" nodes representing different tasks available to an end user of the scalable application. The container nodes 44 may also be logical panels that may be further divided into sub-task nodes, sub-sub-task nodes, etc. until the component nodes or "leaf" nodes representing individual SGUI components or composite SGUI components are reached.

In the example illustrated in FIG. 14, a container node 44m identified as "Search Item Task" includes a first task node 44n identified as "Search Task", a second task node 44p identified as "Sort Result Task" and a third task node 44q identified as "Display Result Task." Each of the task nodes 44n, 44p and 44q may represent logic panels and include component nodes. In the illustrated example, the component nodes are illustrated in an example GUI presentation 404 such as, a J2SE Swing GUI generated from the platform independent presentation model of the IR tree 40. Accordingly, the SGUI components in the IR tree 40 are mapped to platform specific GUI components in the J2SE Swing to form the GUI presentation 404.

The container node 44n identified as "Search Task" may represent a logical panel that is divided into three sub-task nodes (component nodes) that are SGUI components or composite SGUI components. The three sub-task nodes are illustrated as a first component node depicted as a "Search For The Item:" virtual label 408, a second component node depicted as a "Search" virtual button 410 and a third component node depicted as a virtual textfield 412. The SGUI components and/or composite SGUI components associated with the second and third container nodes 44p and 44q are similarly depicted by platform specific GUI components within the GUI presentation 404 as illustrated to provide sorting preference tasks and display option tasks selectable by the end user of the scaleable application.

Within a platform independent presentation model the SGUI components and composite SGUI components may be referred to as "platform independent (PI) widgets" or "platform independent GUI widgets." The SGUI components and composite SGUI components may be represented by platform specific (PS) widgets in platform specific presentations. As previously discussed, representation of the SGUI components and composite SGUI components with the platform specific widgets is based on predetermined mapping. The mapping is between the scalable GUI component library module 22 and device-specific GUI components in other libraries. The predetermined mapping associates platform specific widgets within platform specific presentations with the SGUI components and composite SGUI components (corresponding platform independent widgets) in the platform independent presentation model.

As previously discussed, properties may be included within each task node of the IR tree 40. The properties may include at least one detailed layout property for each node, at least one task preference property, at least one priority property and at least one split-ability property related to one or more of the corresponding task nodes. The detailed layout properties for each task node may be similar to, for example, Java Gridbag layout constraints in providing the relative position of a platform independent widget within a page. The task preference properties may be implemented as an array of Boolean functions in which an array index may represent a particular heterogeneous device platform and/or describe whether a task is suitable for a particular platform. The priority properties may be implemented as an integer to describe the desired layout sequence of each platform independent widget. The split-ability property may be implemented as a Boolean function to indicate whether platform independent widgets may be spread over multiple pages of a presentation.

In one embodiment, each task node may also include at least one importance property indicative of the importance of the corresponding task node. The importance properties may be implemented as a Boolean function(s) to indicate whether the platform independent widgets(s) represented by a task node is core or optional.

Core platform independent widgets may be defined as frequently used platform independent widgets or platform independent widgets that perform a major task within a scalable application. The remaining platform independent widgets may be defined as optional platform independent widgets. For example, the "Search Item Task" container node 44m illustrated in FIG. 14 has three hierarchal related sub-tasks (container nodes 44n, 44p, 44q) as previously discussed. In order to perform a Search Item task, an end-user of the scaleable application may enter the item's name in the virtual textfield 412 and activate the virtual button 410 to initiate the searching process. In this example, however, an end-user may not need to specify the sorting preferences and the display options, as they are just enhancements for displaying the search result. Thus, platform independent widgets associated with the Search task container node 44n may be identified as core and the platform independent widgets associated with Sort Result Task container node 44p and the Display result task container node 44q may be identified as optional by developers of the application.

Referring again to FIG. 13, properties specified by application developers in the intermediate representation may be utilized by the task manager 18 and the transformation manager 20. The task manager 18 may use the task preference property and the transformation manager 20 may use the remaining properties during a GUI migration.

Figure 15:
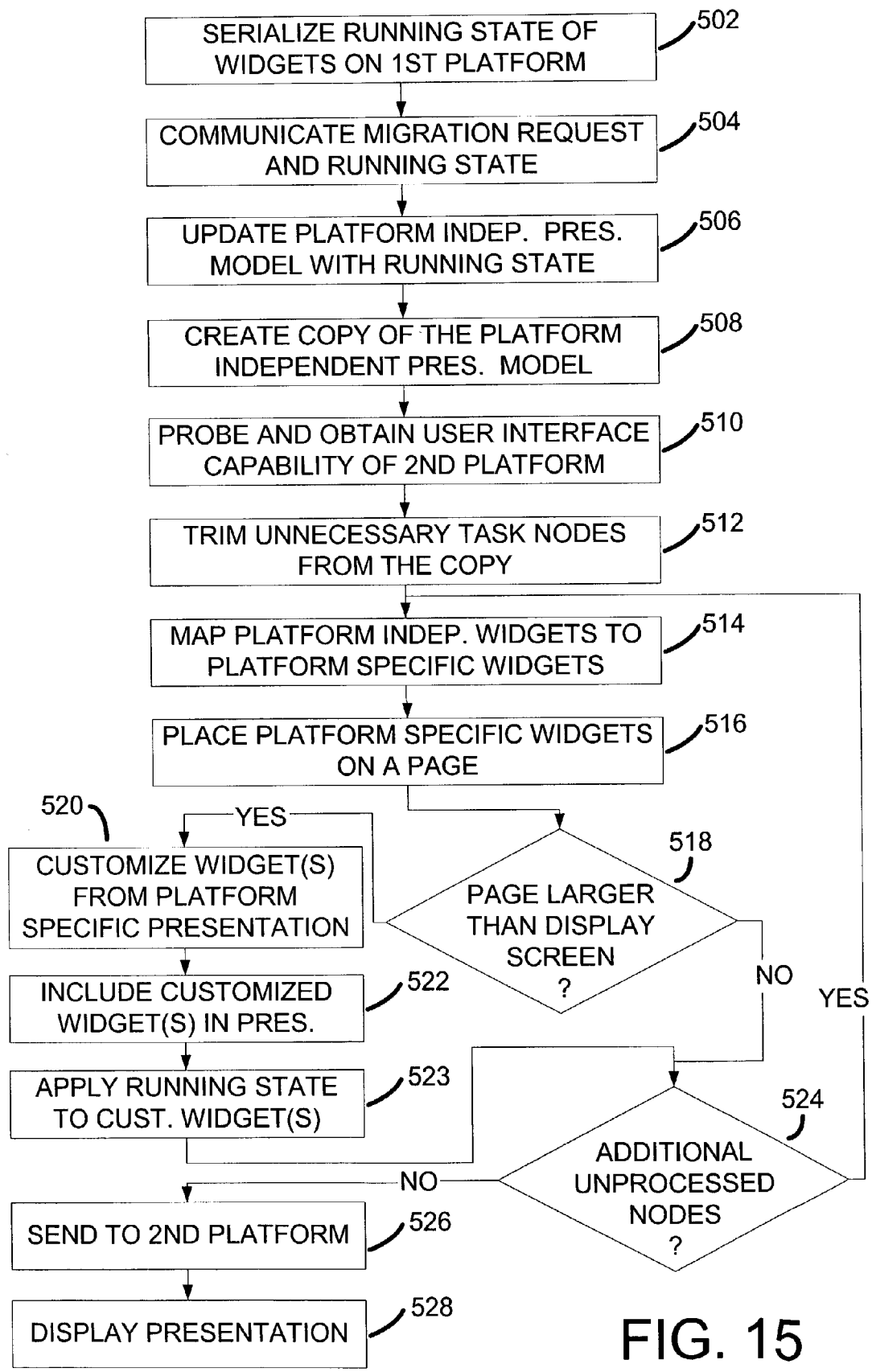
FIG. 15 is a flow diagram illustrating operation of the scalable graphical user interface system during a GUI migration within the communication system illustrated in FIG. 13.

FIG. 15 is a process flow diagram of an example migration of the running state of a GUI application from the first platform 302 to the second platform 304 illustrated in FIG. 13. In this example GUI migration, a platform specific presentation was previously generated from the platform independent presentation model with the customization module 14 and provided to the first platform 302. The first platform 302 may provide an interactive display on an associated display screen based on the platform specific presentation.

The operation begins at block 502 when the running state of the platform specific widgets in the platform specific presentation displayed on the first platform 302 may be serialized. At block 504, a migration request identifying the second platform 304 as the migration target device along with the serialized running state of the platform specific widgets is communicated over the network 208 to the server 306. The state of the platform independent widgets included in the platform independent presentation model is updated with the running state of the platform specific widgets provided by the first platform 302 at block 506. At block 508, a copy of the platform independent presentation model is created.

The server 306 probes the GUI capabilities of the second platform 304 and obtains user interface related capabilities such as display screen size, user input mechanisms, etc. at block 510. At block 512, the task manager 18 utilizes the task preference properties and trims off unnecessary task nodes from the copy of the platform independent presentation model to begin generation of a platform specific presentation for the second platform 304.

At block 514, the transformation manager 20 selects a node from the copy of the platform independent presentation model and maps the platform independent widget(s) associated with the node to a platform specific widget(s) for the second platform 304. The platform specific widget(s) is placed in a page of the platform specific presentation at block 516. It is determined if the page size is larger than the display screen of the second platform 304 at block 518. If the page size is too large to fit the display screen, the transformation manager 20 customizes the platform independent widget(s) from the copy of the platform independent presentation model to fit one or more pages to the display screen at block 520. At block 522, the customized platform independent widget(s) is mapped to platform specific widget(s) for the platform specific presentation. The running state of the platform independent widget(s) in the platform independent presentation model is applied to the running state of the platform specific widget(s) for the platform specific presentation at block 523.

It is determined if there is additional unprocessed nodes within the platform independent presentation model at block 524. If yes, the operation returns to block 514 to select another node and add corresponding platform specific widget(s) to the page(s), etc. to continue generating the platform specific presentation. If no, the generated page(s) of the platform specific presentation, the final copy of the platform independent presentation model and the portion of the scalable GUI library 12 utilized by the platform specific presentation is transmitted to the second platform 304 at block 526. If the page fits the display screen at block 518, the operation proceeds directly to block 522 to determine if additional unprocessed nodes exist. At block 528, the render manager 16 of the second platform 304 displays the presentation on the display screen using the transmitted platform specific presentation, the final copy of the platform independent model and the portion of the scalable GUI library 12.

Customization during generation of the platform specific presentation to fit the page(s) may involve layout customization of the widgets and transformation customization of the widgets as previously discussed. Such customization may be based on the following requirements: 1) generate a presentation with reasonably high quality with minimal guidance specified by application developers; 2) keep the customization relatively simple to minimize delay in generation of the presentation; and 3) avoid having to scroll within a display screen to view an entire page of a platform specific presentation.

As previously discussed, layout customization may involve processing each of the nodes in the IR tree to place the associated platform specific widgets in a page. Placement of the platform specific widgets during layout customization may also involve modifications to optimize the size of the page to fit the display screen of a target heterogeneous device platform. The initial layout of the platform specific widgets may be based on layout properties of the platform independent widget(s) associated with the nodes that are specified by the application developers. The layout properties may be similar to Java Gridbag constraints and indicate the relative position of the corresponding platform specific widgets on the page to fit the largest anticipated display screen. If the size of the page does not fit the display screen of a target heterogeneous device platform, the layout of the platform specific widgets may be further customized by customizing the platform independent widgets.

Further layout customization may include dynamically rearranging the platform independent widgets within the page using a flow layout manager. Dynamically rearranging the platform independent widgets with the flow layout manager may involve, for example, positioning platform independent widgets in two or more rows instead of one row, etc. The platform independent widgets that are dynamically rearranged may be those with corresponding platform specific widgets that cause the page of the presentation to exceed the size of the display screen. Alternatively, other criteria, such as physical space consumed, priority, etc. may determine which of the platform independent widgets that correspond to platform specific widgets in a page are selected for dynamic rearrangement.

The flow layout manager may be invoked by the transformation manager 20, or may be part of the transformation manager 20. An example of a flow layout manager is Java FlowLayout. In addition, those platform independent widgets that are composite SGUI components which are specified by application developers as split-able with the splitability property may be divided into single SGUI components. The platform specific widgets that the single SGUI components are mapped to may be divided among multiple pages of the presentation based on the priority property associated with the single SGUI components or any other property(s). Layout of the split up single SGUI components may be performed with the flow layout manager. Note that composite SGUI components may also be specified as non-splitable by application developers. Following layout customization, if the page(s) of the presentation still does not fit the display screen, transformation customization may be initiated.

Transformation customization involves the application of transformation rules as previously discussed. The transformation rules may be applied to achieve suitable size modification of the platform specific widgets in the page(s) to fit the display screen of the target heterogeneous device platform. One goal of transformation customization may be to avoid applying a scrolling feature, by reducing the size of the page(s) of a presentation to fit completely within the display screen of a target heterogeneous device platform.

During transformation customization, the transformation manager 20 may determine which platform independent widget(s) should be transformed and how the platform independent widget(s) should be transformed. Determination of which platform independent widget(s) to transform may be based on identifying those widget(s) that are transformable and therefore trigger transformation rules. Platform independent widgets that trigger transformation rules may be those widget(s) that are non-splitable single or composite SGUI components that map to platform specific widgets which cause the size of a page of a presentation to exceed the size of the display screen.

How the platform independent widget(s) are transformed is based on the identified widget. If the platform independent widget is a single SGUI component, a transformation rule may be applied to that single SGUI component. If, however, the platform independent widget is a composite SGUI component, each of the single SGUI components within the composite SGUI component may be categorized as core SGUI components and optional SGUI components. Categorization of the single SGUI components within a composite SGUI component may be based on the importance properties specified by the application developers within each task in the presentation model.

Transformation rules may be applied to the optional SGUI component(s) first, since transforming a platform independent widget into a more compact widget may degrade the GUI usability. If no optional SGUI component(s) were specified with the importance properties, or the size reduction of the transformed optional SGUI components is insufficient to allow the page to fit the display screen of the target heterogeneous device platform, transformation rules may be applied to the core SGUI component(s).

The transformation manager 20 may also determine how to transform platform independent widget(s) that are single SGUI components by determining the best suitable transformation rule from a set of rules. As previously discussed, suitable rules are those transformation rules that may provide sufficient change in the size of a corresponding platform specific widget to fit the size of the display screen. The transformation rules may be categorized into four types: (1) One-to-One type transformation rules; (2) One-to-Multiple type transformation rules; (3) Multiple Same Class-to-One type transformation rules; and (4) Multiple-to-Multiple type transformation rules.

One-to-One type transformation rules may provide transformation of a platform independent widget that is a single SGUI component to another platform independent widget that is a single SGUI component. For example, referring again to FIG. 5, the list illustrated as the first SGUI component 70 is transformed to a drop-down box in the second SGUI component 72 by a one-to-one type transformation rule. One-to-Multiple type transformation rules may provide transformation of a platform independent widget that is a single SGUI component to multiple platform independent widgets that are each single SGUI components. An example One-to-Multiple type transformation rule may transform a single platform independent widget representing a table of data to single platform independent widgets that are lists of data or single platform independent widgets that are drop-down boxes of data.

Multiple Same Class-to-One type transformation rules may provide transformation of multiple platform independent widgets (each being a single SGUI component) that belong to the same class to a platform independent widget that is a single SGUI component. For example, multiple single platform independent widgets each representing radio buttons in the same class may be transformed to a single platform independent widget representing a list or a drop-down box. Similarly, a number of single platform independent widgets representing textfields or labels may be transformed to a single platform independent widget representing one textfield or one drop-down box, respectively.

Multiple-to-Multiple type transformation rules may provide transformation of multiple platform independent widgets that belong to different classes to another set of corresponding multiple platform independent widgets. Each Multiple-to-Multiple type transformation rule may include one or more Multiple Same Class-to-One type transformation rules and corresponding relationships between different platform independent widgets, such as a form filling relationship.

Form-Filling describes the relationship between platform independent widgets that allows data entered by an end user of the scaleable application into a platform specific widget to appear in the transformed platform specific widget. In other words, form filling allows the running state of platform specific widgets within a first platform specific presentation to be similarly present in the running state of the platform specific widgets that have been transformed to a second platform specific presentation. The relationships may be provided in the platform independent presentation model by developers, knowledge based systems, experimentation or any other mechanism for creating associations between platform independent widgets and corresponding transformed platform independent widgets.

For example, referring again to FIG. 6, the labels (e.g. "item name", "brand name", etc.) within the set of data entries 80 may be transformed to a pick list 86 and the corresponding data entry fields may be transformed to a single data entry 88 utilizing applicable Multiple Same Class-to-One type transformation rules. These two transformations may be linked together with a form-filling relationship in the platform independent presentation model and therefore in the platform specific model.

Linking of platform independent widget(s) transformed with Multiple Same Class-to-One type transformation rules and Multiple-to-Multiple type transformation rules with other platform independent widgets may also be performed by the transformation manager 20. Linking refers to the operational association between two or more platform specific widgets in a presentation such as the operational relationship between the virtual button 410 and the virtual textfield 412 of FIG. 14. Accordingly, linking between a first platform specific widget and a second platform specific widget may cause changes in the running state of the first platform specific widget to affect the running state of the second platform specific widget. The linking between the platform specific widgets may be provided by linking of corresponding first and second platform independent widget in the platform independent presentation model.

When a transformation rule is employed, the running states of original platform independent widgets may be expressed in another form. Changes to the running states may be platform-specific since different transformation rules may be applied to the original platform independent widgets based on the constraints of a particular platform. In order to preserve the running states of the original platform independent widgets, the running states may be saved to the platform independent presentation model. That is, the running states of the transformed platform independent widgets may be mapped to the running states of the original platform independent widgets.

Transformed platform independent widgets may be device independent widgets that are chosen by a transformation rule to appear on the display screen of a target device as corresponding platform specific widgets. Original platform independent widgets are the device independent widgets originally chosen by developers to appear on the target screen. Original platform independent widgets may be attached to the platform independent presentation model. Similarly, transformed platform independent widgets may be attached to the platform independent presentation model when a transformation is successful. Both attachments may be expressed in the form of component nodes, where each of the component nodes represent at least one platform independent widget.

In order to perform running state transformation, the platform independent presentation model may include instances of both the original platform independent widgets and the transformed platform independent widgets. Depending on the execution time of the GUI migration, however, instances of only the original platform independent widgets or only the transformed platform independent widgets may be in an active state at the same time.

Figure 16:
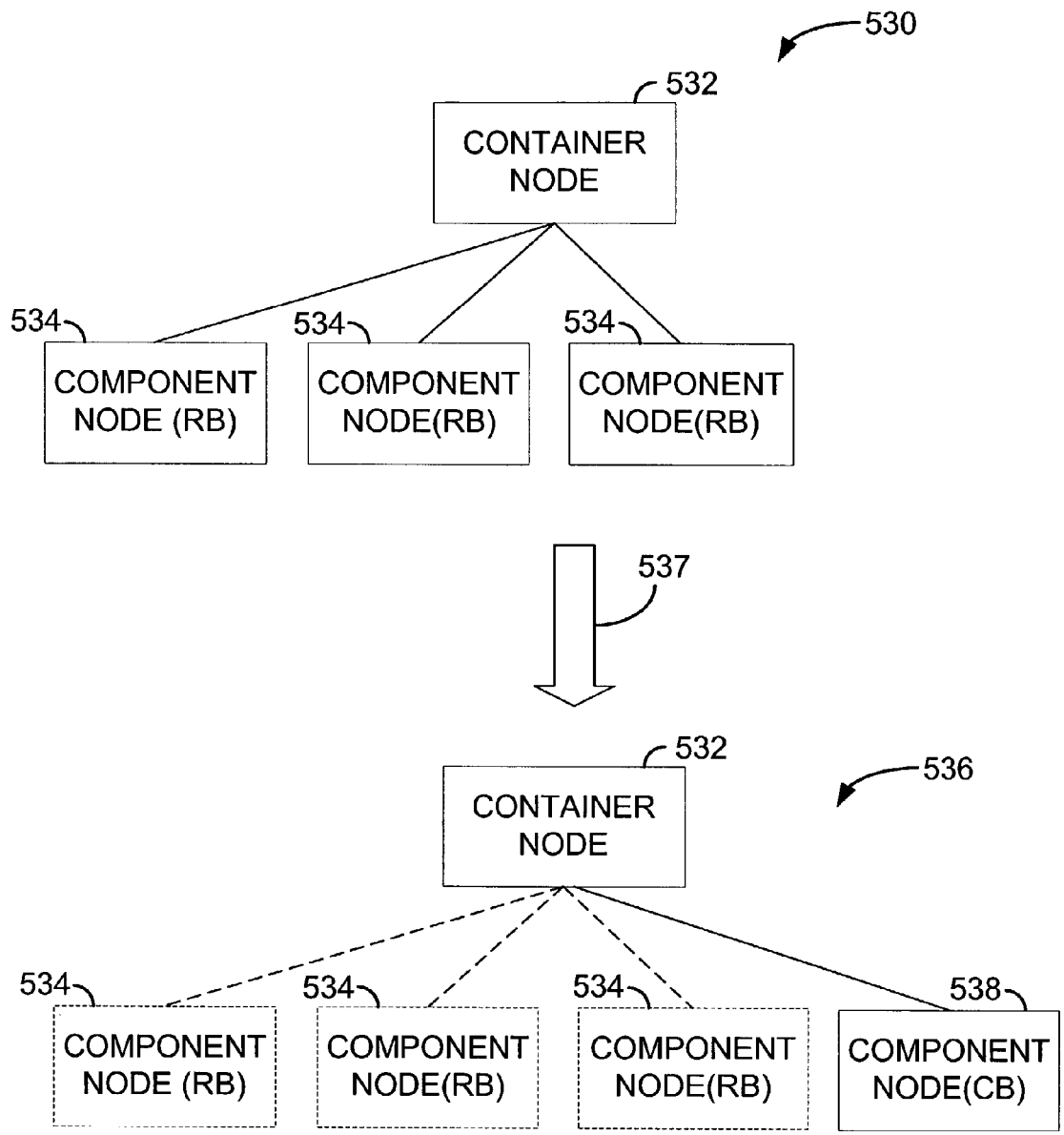
FIG. 16 is an example transformation within a platform independent presentation model using the scalable graphical user interface system of FIG. 1.

FIG. 16 depicts an example platform independent presentation model 530 to illustrate the attachment of transformed platform independent widgets and changes in the active state. The illustrated platform independent presentation model 530 includes a container node 532 and a plurality of logically associated original component nodes 534. The container node 532 may represent a platform independent widget that is a logic panel and each of the original component nodes 534 and associated platform independent widget(s) may represent platform independent widget(s) that are radio buttons (RB) within the panel.

During generation of a platform specific presentation with a platform independent presentation model copy 536, transformation(s) may occur, as illustrated by arrow 537. The transformation(s) may be triggered when the platform specific widget(s) that is mapped to the platform independent widget(s) representing the container node 532 is too big to be placed onto the display screen of a target heterogeneous device. The transformation may, for example, leave the container node 532 unchanged and transform all the platform independent widgets representative of radio buttons (the original component nodes 534) to a transformed component node 538 that may represent a combo box (CB). The combo box may be a smaller platform independent widget providing functionality similar to the radio buttons.

The transformed component node 538 may be a new component node created in the platform independent presentation model 536 to store/represent the transformed widgets. Following transformation, the transformed component node 538 may be linked to the container node 532 as a "transformed child node" to form a new logical association. The new logical association may become active and replace the existing logical association between the container node 532 and the original component nodes 534. The transformed child node (transformed component node 538) may be referred to as the only child node of the container node 532.

The previous logical association between the container node 532 and the original component nodes 534 may be retained as logic references in the platform independent presentation model 536 as illustrated by the dotted lines in FIG. 16. The original component nodes 534, however, may no longer be referred as the child nodes of container node 532, unless explicitly specified by the developers. As such, the layout structure of the IR tree no longer includes the original component nodes 534. The logic references may be retained, to support migration of the running state and event handling from one platform specific presentation to another platform specific presentation as discussed later.

To select the best suitable transformation rule, the rules may first be prioritized according to their types. Since Multiple-to-Multiple type transformation rules may significantly change the overall presentation, and may degrade the GUI usability, the Multiple-to-Multiple type transformation rules may be assigned the lowest priority. For other transformation rules, the transformation manager 20 may filter the rules before doing any prioritization.

Filtering the transformation rules may eliminate transformation rules producing a transformed platform independent widget that is not compatible with the functionality or any other parameter of the original platform independent widget. Incompatible functionality may include transformation rules where the original platform independent widgets require input mechanisms that are not supported by the transformed platform independent widgets. For example, if an application developer specifies mapping for a platform independent widget to a J2ME DoJa button that is interactive with a mouse-in event (i.e., when a mouse-arrow points to a button (not clicks)), to invoke an action. The button cannot be transformed to a softkey during transformation customization since a softkey does not support a mouse-in event. Accordingly, the transformation rule supporting this transformation may be eliminated for this platform independent widget by filtering.

The transformation manager 20 may prioritize the remaining transformation rules according to a set of space reduction parameters. The priority of the space reduction parameters may be based on the size of the platform independent widget subject to transformation and/or the amount of size reduction resulting from application of the transformation rule to the platform independent widget. Space reduction in platform specific widgets in pages of a platform specific presentation is realized by space reduction in the corresponding platform independent widgets.

The transformation rule that provides the least space reduction may be given highest priority. Highest priority may be given to the least space reduction since a less compact corresponding platform specific widget may have a higher GUI usability than a more compact platform specific widget. The space reduction parameters may include: a width reduction ratio, a height reduction ratio and a dimension reduction ratio of the platform independent widgets.

The priority of the space reduction parameters may be dynamically changed according to the condition of the platform independent widget that triggers transformation rules. For example, when a transformation rule is triggered for a platform independent widget by a corresponding platform specific widget that is too wide, the width reduction ratio may be identified as the most important parameter. The height reduction ratio may be identified as the second most important parameter, and the dimension reduction ratio may be ignored. The dimension reduction ratio may be ignored since the result of this ratio is already covered by the width and height reduction ratios. Similarly, when a transformation rule is triggered by a platform specific widget that is too tall, the height reduction ratio may be identified as the most important parameter, the width reduction ratio may be identified as the second most important parameter, and the dimension reduction ratio may be ignored. When a transformation rule is triggered by a platform specific widget that is both too wide and too tall, the dimension reduction ratio may be identified as the most important parameter, and the remaining parameters may be ignored.

The categorization of the transformation rules into types, the filtering and the space reduction may be sequentially performed to prioritize the transformation rules. Alternatively, only the type categorization, filtering or the space reduction may be utilized for determining prioritization. Further, any combination and order of the type categorization, filtering and/or the space reduction may be utilized for determining prioritization.

Where the heterogeneous device platforms are executing scalable applications created with Java technology, the transformation rules may be specified in Java classes. Each transformation rule may be represented by one Java class. Inside a class, running state and event handling transformations may also be specified by the application developers for the platform independent widgets.

An example of a transformation rule created using Java to provide the transformation illustrated in FIG. 6 may be:
private class FormFillingTransformation {
/* platform independent widget transformation */
construct a new platform independent widget that is a drop-down box (DD1) copy the virtual "Item Name::", "Brand Name:", . . . etc labels' properties (e.g., font size) to DD1
3. construct a virtual textfield (TF1)
4. copy the virtual "Item Name:", "Brand Name", . . . etc. textfields' properties to TF1
/* running state transformation */
Record the original virtual label and example textfield pairs into the following Java hash table:

| Item Name | Bottle Water |
|---|---|
| Brand Name | Alhambra |
| Quantity | 4 |
| Expected Price/Unit | $.075 |

Figure 17:
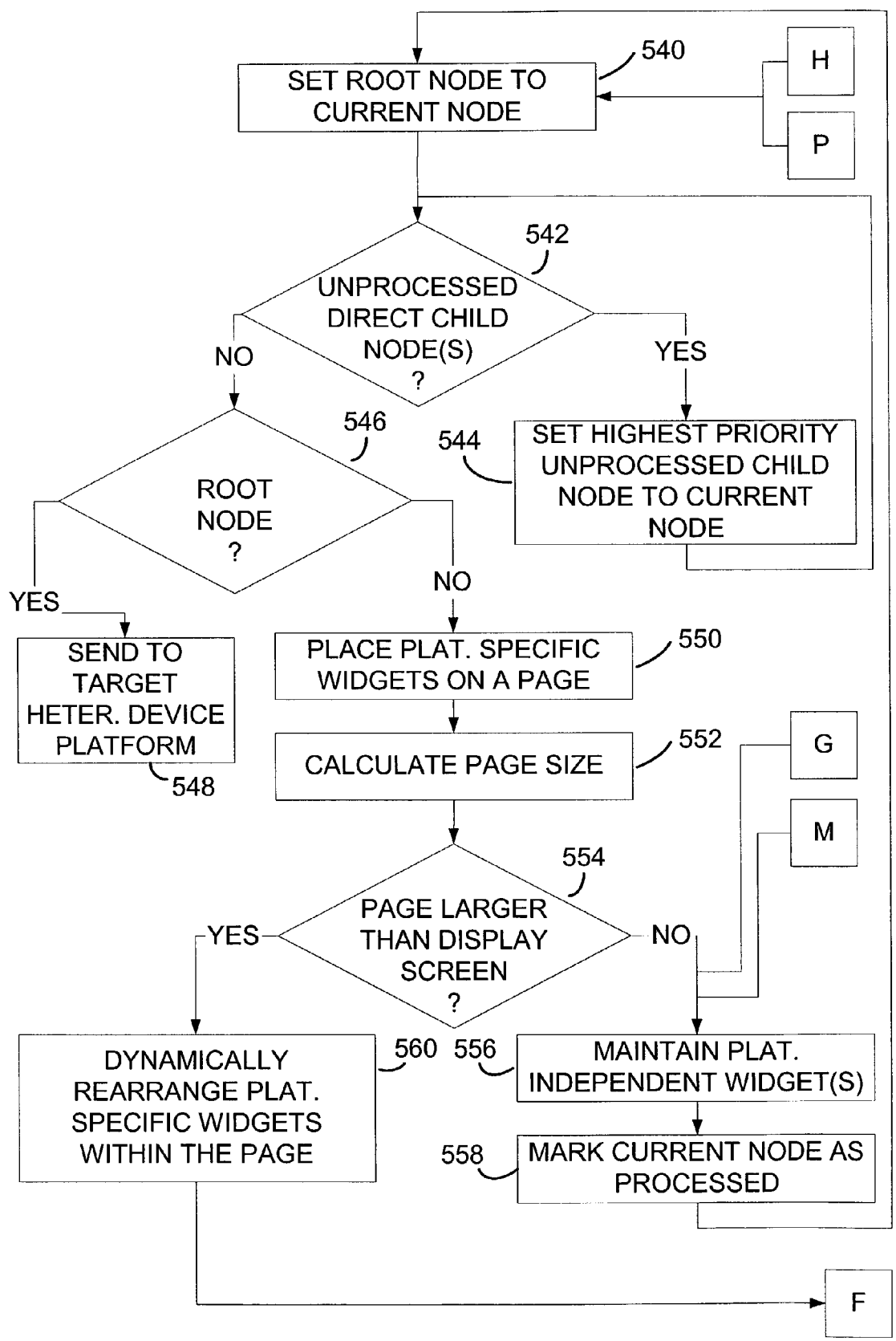
FIG. 17 is a flow diagram illustrating customization of a page with the scalable graphical user interface system illustrated in FIG. 13.

2. Add a scalable Selection event listener (from an event library) to DD1, and specify the action. So that when an end-user selects an item from DD1, e.g., "Item Name:" the corresponding value, e.g., "Bottle Water", can be retrieved from the hash table.
3. Display the value onto TF1
/* event handling transformation */
//originally, application developers specify that the value of "Item Name", or "Brand
//Name", or . . . etc. textfields will be automatically updated when an end-user
//hits ENTER or an equivalent key
//After a migration, when an ENTER key event is received,
Get the value on TF1, such as "Coke"
Get the currently selected item on DD1, such as "Item Name"
Find the title of the selected item in the hash table and update the corresponding value.
4. Create an event with "Item Name" as the source of the event and "Coke" as the new value.
5. Send the event to the original virtual "Item Name" textfield to synchronize the states of the original and transformed textfields.
}
FIG. 17 is a process flow diagram depicting one embodiment of the process of layout customization and transformation customization that will be discussed with reference to FIGS. 13 and 14. At block 540 the operation begins by setting the root node 44a of the IR tree 40 to the current node. It is determined if there are unprocessed direct child node(s) of the current node at block 542. If yes, the highest priority unprocessed direct child node is set to the current node at block 544 and the operation returns to block 542. If there are no unprocessed direct child node(s), it is determined if the current node is the root node 44a at block 546. If yes, the platform specific presentation, the copy of the platform independent presentation and the associated parts of the scalable GUI library 12 are sent to the target heterogeneous device platform at block 548.

If the current node is not the root node 44a, the platform specific widgets represented by sub-nodes associated with the current node within the platform independent presentation model may be placed on a page based on properties specified by the application developers at block 550. The properties may be similar to Java Gridbag constraints to indicate the position of the platform specific widgets on the page. At block 552, the page size is calculated. The size of the page is compared to the size of the target display screen at block 554. If the page fits within the target display screen, the platform independent widget(s) associated with the current node are maintained in the copy of the platform independent presentation model at block 556. At block 558, the current node is marked as processed and the operation returns to block 540 to select another current node. If on the other hand, the size of the page is larger than the target display screen at block 554, the platform specific widgets are dynamically rearranged within the page by rearranging the platform independent widgets using the flow layout manager at block 560.

Figure 18:
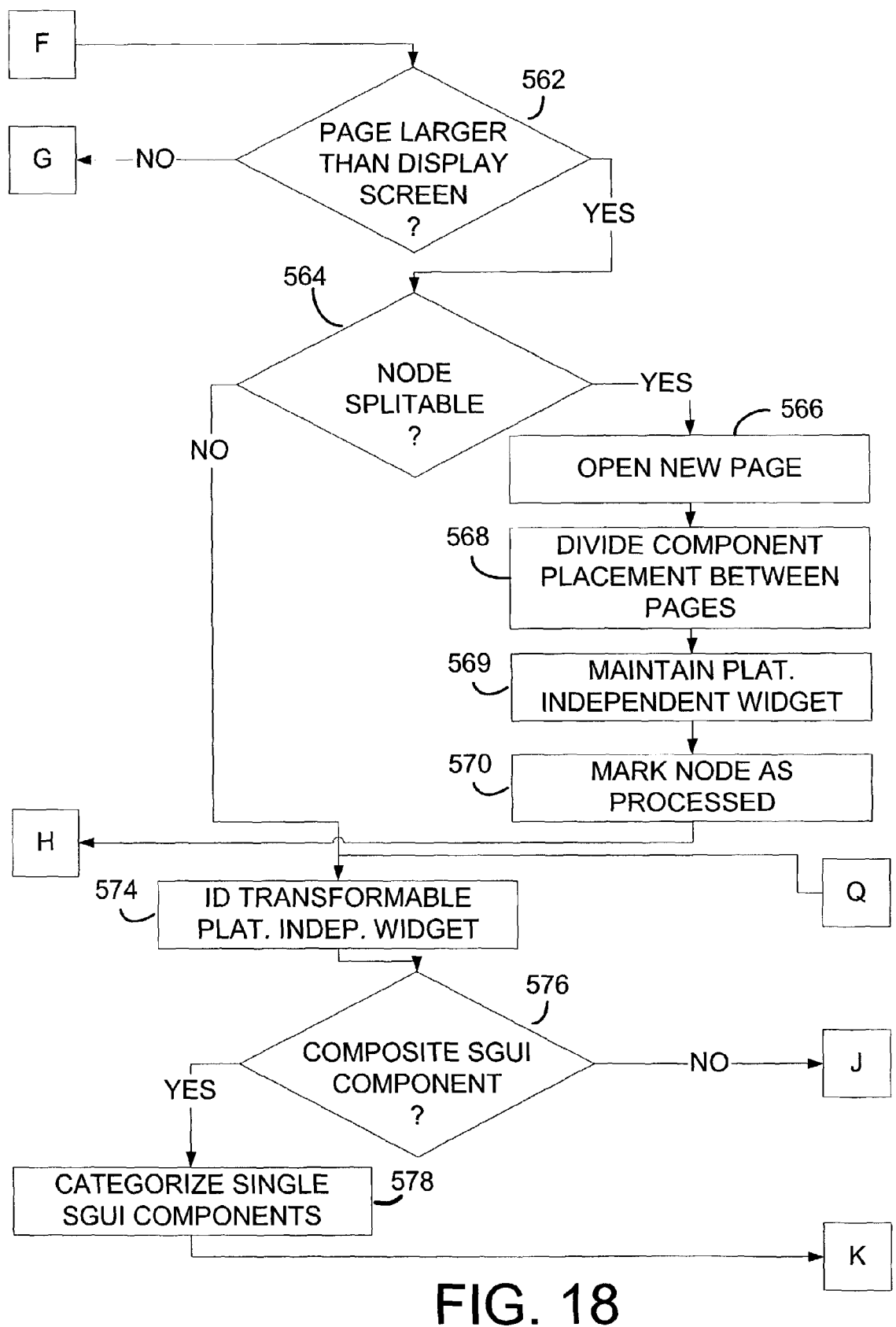
FIG. 18 is a second portion of the flow diagram illustrated in FIG. 16.

Referring now to FIG. 18, the size of the page is again compared to the size of the target display screen at block 562. If the page fits within the target display screen, the operation returns to block 556 to maintain the platform independent widgets in the copy of the platform specific presentation. If the page is still larger than the target display screen, it is determined whether the current node (platform independent widget(s)) or any associated sub-nodes are splitable node(s) at block 564. If yes, at block 566, at least a second page is instantiated. The placement of the platform specific widgets associated with the identified splitable node(s) is divided between the first page and at least the second page with the flow manager until the presentation fits the page at block 568. At block 569, the platform independent widgets are maintained in the copy of the platform independent presentation. The current node is marked as processed at block 570 and the operation returns to block 540 to select another current node.

If at block 564, none of the associated sub-nodes or the current node are splitable, a transformable platform independent widget associated with the current node is identified at block 574. Determination of whether the platform independent widget is a composite SGUI component is performed at block 576. If the platform independent widget is a composite SGUI component, the single SGUI components within the composite widget are categorized as core SGUI components and optional SGUI components based on the importance property at block 578.

Figure 19:
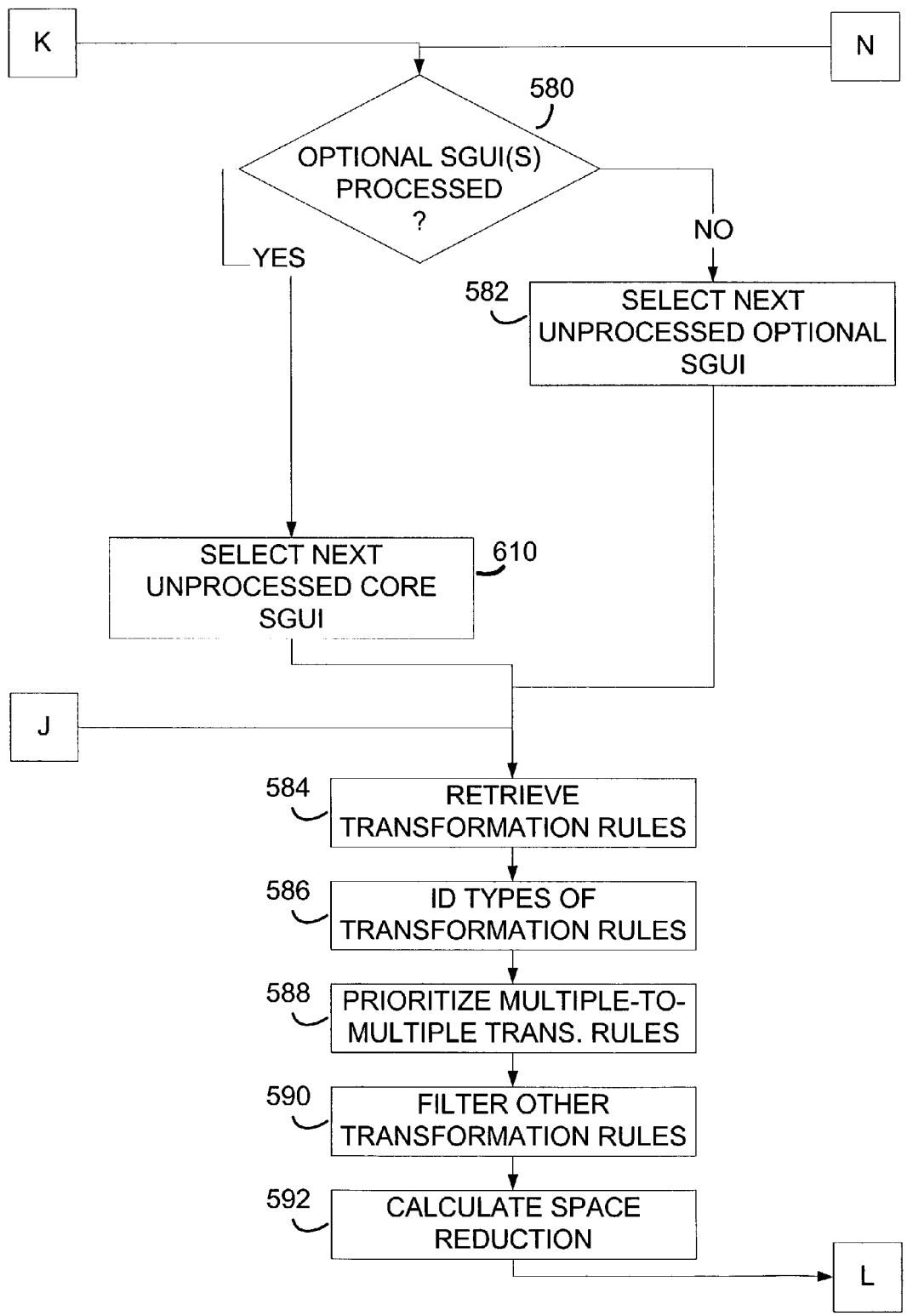
FIG. 19 is a third portion of the flow diagram illustrated in FIG. 16.

Referring now to FIG. 19, at block 580, it is determined if the optional SGUI components have all been processed. If no, the next unprocessed optional SGUI component is selected at block 582. All applicable transformation rules are retrieved for the selected SGUI component at block 584. At block 586, the retrieved transformation rules are identified as one of the four types of transformation rules. The Multiple-to-Multiple type transformation rules are prioritized with lowest priority at block 588. At block 590, the other three types of transformation rules are filtered to remove incompatible rules. For each of the remaining rules within the three types of transformation rules the anticipated space reduction of the transformed SGUI component is calculated at block 592.

Figure 20:
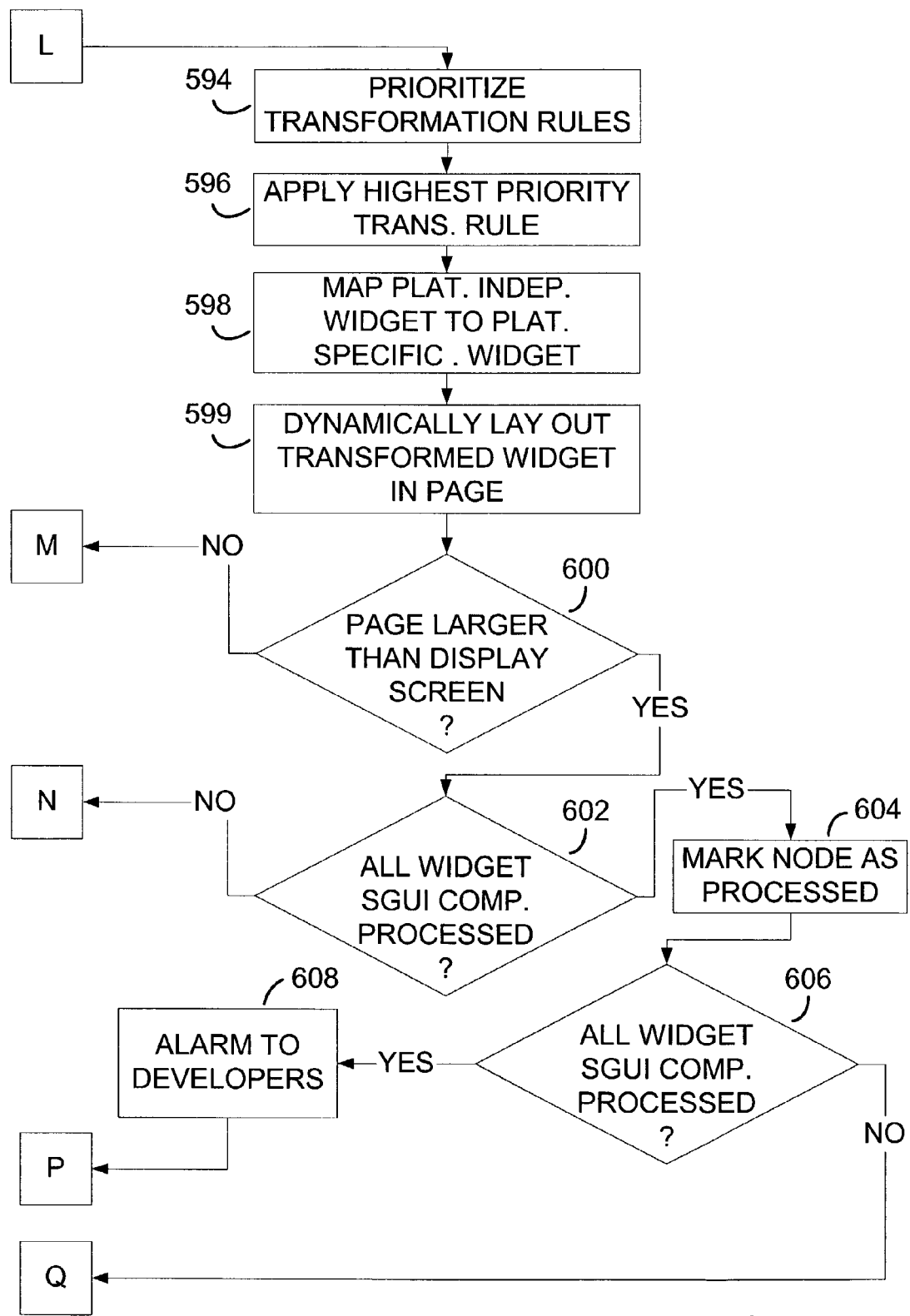
FIG. 20 is a fourth portion of the flow diagram illustrated in FIG. 16.

Referring now to FIG. 20, at block 594, all the remaining rules are prioritized according to the amount of space reduction. The transformation rule with the highest priority (least space reduction) is applied to the SGUI component at block 596. At block 598, the transformed SGUI component is mapped to a platform specific widget. The platform specific widget is dynamically laid out in the page by the flow layout manager at block 599. It is determined if the page is too large for the display screen of the target heterogeneous device platform at block 600. If no, the operation returns to block 556 of FIG. 17 to maintain the platform independent widget associated with the current node in the copy of the platform independent presentation model, etc. If the page is still too large, it is determined if all the SGUI components in the platform independent widget have been processed at block 602. If no, the operation returns to block 580 of FIG. 19. If all the SGUI components in the platform independent widget have been processed, the node for the corresponding platform independent widget is marked as processed at block 604. At block 606, it is determined if all the transformable platform independent widgets associated with the current node have been processed. If no, the operation returns to block 574 of FIG. 18 to identify another transformable platform independent widget. If all transformable platform independent widgets associated with the current node have been processed, an alarm is generated to the application developer indicating that the node cannot be reduced to fit the display screen at block 608, and the operation returns to block 540 of FIG. 17 to select another current node.

Referring again to FIG. 19, if at block 580 it is determined that all the optional SGUI components in the platform independent widget have been processed (or none exist), an unprocessed core SGUI component is selected at block 610 and the operation continues at block 584. Referring back to FIG. 18, if at block 576 the platform independent widget is not a composite SGUI component, the operation proceeds to block 584 of FIG. 19 to process the platform independent widget with a single SGUI component similar to a platform independent widget with a composite SGUI component.

Referring once again to FIG. 13, transformation of the running states and the event handling of the platform independent widgets may also occur as part of the transformation customization. As previously discussed, the migrated presentation may employ a different set of platform specific widgets from the original presentation. To maintain application continuity for the end user, the running states of the platform specific widgets in the original platform specific presentation may be mapped to the platform specific widgets in the migrated platform specific presentation.

Migration of the running states may be performed utilizing the scalable GUI library 12 to map the current running state of a platform specific widget in a first platform specific presentation to the running state of a corresponding platform independent widget in the platform independent presentation model (the intermediate representation). A copy of the platform independent presentation model may then be copied, trimmed and the corresponding platform specific widgets associated with the nodes may be placed in a page during development of a second platform specific presentation for a target heterogeneous device platform as previously discussed. The running state of the platform independent widgets in the platform independent presentation model may be applied as the running states of the corresponding platform specific widgets in the second platform specific presentation. Accordingly, the current running state of the first platform specific presentation may be implemented in the second platform specific presentation.

Prior to a migration, the current running state of a platform specific widget and that of the corresponding platform independent widget may be synchronized. Synchronization may involve updating the running state of the platform independent widget with appearance, state changes and/or data captured from the platform specific widget. The running state of the platform independent widget may be maintained during development of the platform specific presentation for the target heterogeneous device platform. Following migration, the running state may be retrieved and presented on a migrated platform specific widget with the platform specific presentation.

When transformation rules are applied during a GUI migration event, similar processes may be performed by mapping current running states of the original platform independent widgets to the transformed platform independent widgets. The transformed platform independent widgets may be mapped to the platform specific widgets in the platform specific presentation. Layout and transformation of a platform independent presentation to achieve a platform specific presentation may be performed as previously described in FIGS. 17-20.

During layout and transformation, when a platform-independent widget (an SGUI component) is mapped to a platform specific widget, an API in the SGUI component library may similarly map the states of the platform independent widget to the states of the platform specific widgets. Thus, the running state may be passed between the platform independent widgets in the platform independent presentation model and the platform specific widgets in the platform specific presentations as GUI migrations occur.

Since the running state mapping may be unique to each transformation rule, each rule may provide a mechanism for transforming the running state. Example running state transformations are included in the previously discussed example transformation rule created using Java code. In the example code, the states of all the original textfields are stored in a Java hash table as shown. The transformed textfield displays these states one at a time, based on the state of the drop-down box.

Running state transformation/mapping procedures may be applied in a number of different types of transformations. For example, when the running states of platform independent widgets are transformed to the running states of platform specific widgets such as during the initial use of the SGUI system and following a migration. In addition, prior to a migration, the running states of platform specific widgets may be transformed to the running states of platform independent widgets. Further, the running states of platform independent widgets may be transformed to the running states of another platform independent widget(s), such as when a transformation is triggered during development of a platform specific presentation.

For example, as previously discussed with reference to FIG. 16, a number of first component nodes 534 such as a set of radio buttons that consume too much space may need to be transformed to a single new second component node 538 such as a combo box. The running state transformation from the running states of the radio buttons to the running state of the combo box, may involve transforming the running states of the platform independent radio buttons to the running states of platform independent combo box through mapping. Alternatively, the running states of platform independent radio buttons may be transformed through mapping to the running states of a platform specific combo box. Further, running state mapping to transform the running state from a platform specific combo box to a platform independent combo box may also be performed. Utilizing platform independent to platform independent running state transformations, the platform independent presentation model may maintain the running states of widgets.

Figure 21:
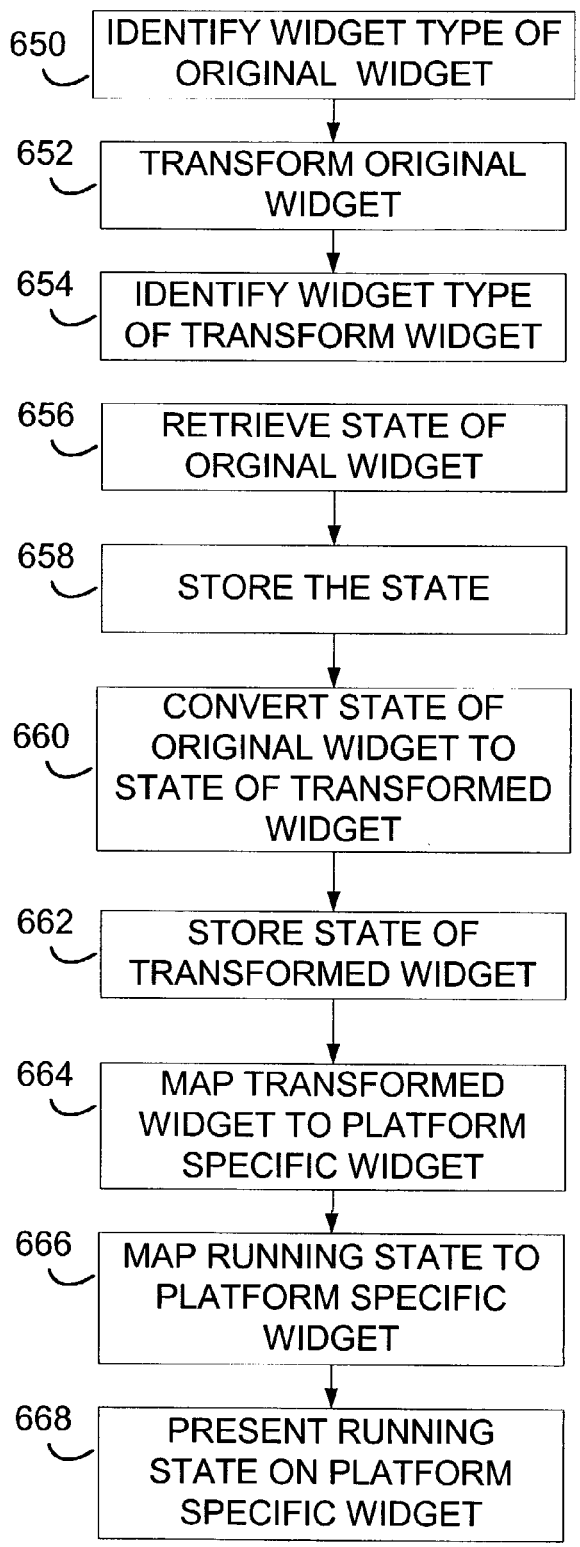
FIG. 21 is a flow diagram illustrating an example of a running state transformation with the scalable graphical user interface system of FIG. 1.

FIG. 21 is a process flow diagram illustrating generally the operation during running state transformation and mapping of a platform independent widget. The operation begins at block 650 where the widget type of an original platform independent widget is identified. Widget types may be for example, a radio button type, a combo box type, etc. At block 652, the original platform independent widget is transformed to at least one transformed platform independent widget. Following successful transformation, the widget type of the transformed widget is identified at block 654. At block 656, the running state of the original platform independent widget is retrieved. The running state is stored in a determined configuration, such as an array at block 658. At block 660, the running state of the original platform independent widget is converted to the running state(s) of the transformed platform independent widget(s) according to the widget type. The converted running states are stored in association with the transformed platform independent widget at block 662. At block 664, the transformed platform independent widget(s) is mapped to a platform specific widget(s) in a platform specific presentation. The running state(s) of the transformed platform independent widget(s) is mapped to the running state of the platform specific widget at block 666. At block 668, the running states(s) of the transformed platform independent widget(s) is presented on the transformed platform independent widget(s).

Event handling transformation may be important to providing the same level of GUI interaction after a GUI migration. An event such as a mouse button push or a typed character input of a platform specific widget on a first heterogeneous device platform may be abstracted to form a virtual event. In another heterogeneous device platform, different events representing the same input to a platform specific widget may be similarly abstracted to the same virtual event. The different events on different heterogeneous device platforms may be mapped to the same input of a platform independent widget in the platform independent presentation model based on the virtual event.

For example, assuming previously discussed FIG. 6 illustrates a GUI migration from a J2SE SWING platform to a J2ME PersonalJava AWT platform. Before the migration, an end user may enter data in the data entry 80 identified as "item name" which may be a SWING textfield and a SWING event may be generated. The SWING event may trigger an action of storing the "item name" data in a database. After the migration, when the SWING textfield transforms to an AWT textfield, the same action may be triggered even though the AWT textfield only supports an AWT event.

Using the scalable GUI library 12, both the SWING event and the AWT event may be abstracted to a generic virtual event. Thus, the associated action is triggered when the generic virtual event is received (e.g. when data is entered for an "item name"). Similar abstractions may be applied when transformation rules are applied to the platform independent widgets. Since the event mapping may be unique to each transformation rule, each rule may also provide event-handling transformation(s). Example event handling transformations are illustrated in the previously described example transformation rule created with Java code to perform the transformation illustrated in FIG. 6. In the code, when an event is generated from a transformed single data entry 88, the transformation manager 20 may act as the original textfield in the corresponding one of the data entries 80 and send out an event for triggering the action.

Similar to the running state transformation/mapping, the event handling transformation/mapping may be implemented uniquely for each transformation. Since event handling does not vary with time as the running state may, migration of the event handling is unnecessary. Instead, the widget type of at least one original platform independent widget and the widget type of at least one transformed platform independent widget may be identified. The available event handling mechanism of each of the types may then be identified. The event handling mechanisms of the original platform independent widget(s) may be mapped to the event handling mechanisms of the transformed platform independent widget(s). The mapping may allow all the features, input and output capability and functionality that affect state changes of the original platform independent widget(s) to be performed by the transformed platform independent widget(s).

The previously discussed embodiments of the SGUI system provide device platform independent operation for application GUIs of scaleable applications. The scalability of the SGUI system allows scaleable applications to successfully operate with various display screen sizes, input methods and GUI libraries associated with the user interface of different heterogeneous device platforms. In addition, the overall design of the SGUI system allows developers of scaleable applications to become familiar with the SGUI system relatively easily while avoiding complexities associated with user interfaces of each of the heterogeneous device platforms on which the scaleable application may operate.

The SGUI system allows the use of device platform independent application GUIs within scaleable applications. The application GUIs may be represented by a platform independent presentation model that is dynamically customized for the target device platform by the SGUI system. Customization of the platform independent presentation model may be based on properties specified by the scaleable application, as well as the capabilities and functionality of the target device platform. Accordingly, the device platform independent application GUIs may be customized by the SGUI system to device platform specific application GUIs for display on any of a plurality of heterogeneous device platforms.

There are 3 important strengths in the SGUI system. Firstly, the concept of a GUI migration. Secondly, allowing end users to avoid the use of a scroll feature by using transformations to fit a page of a presentation to the screen size of a display screen of a target heterogeneous device platform. Thirdly, the flexibility that allows application developers to build application-specific transformation rules that best support the application GUI of a particular scaleable application.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense

What is claimed is:

1. A method of migrating the running state of an application graphical user interface from one heterogeneous device platform to another heterogeneous device platform, the method comprising:
   a) instantiating a first platform independent presentation model of an application in response to determining to migrate the application, including updating the running state of the first platform independent presentation model with a current running state of a platform specific presentation operable on a first heterogeneous device platform, wherein the running state of the first platform independent presentation model is received in serialized form over a network;

b) generating a second platform specific presentation capable of operation on a second heterogeneous device platform by dynamically customizing the first platform independent presentation model based on graphical user interface capabilities of the second heterogeneous device platform; and c) implementing the current running state from the first heterogeneous device platform in the second platform specific presentation to migrate the application from the first heterogeneous device platform to the second heterogeneous platform.

2. The method of claim 1, wherein a) comprises synchronizing the current running state of a platform specific graphical user interface widget included in the first platform specific presentation to the running state of a corresponding platform independent graphical user interface widget included in the first platform independent presentation model.

3. The method of claim 2, wherein b) comprises passing the running state from the platform independent graphical user interface widget to a platform specific graphical user interlace widget included in the second platform specific presentation.

4. The method of claim 1, wherein b) comprises transforming the running state of a platform independent graphical user interface widget included in the first platform independent presentation model when the platform independent graphical user interface widget is transformed.

5. The method of claim 1, wherein c) comprises maintaining at least one of appearance, state changes and entered data displayed in the first platform specific presentation for display in the second platform specific presentation.

6. A method of migrating the running state of an application graphical user interface from one heterogeneous device platform to another heterogeneous device platform, the method comprising:

a) obtaining the current running state of a first platform specific graphical user interface widget included in a first platform specific presentation operable on a first heterogeneous device platform, wherein a) comprises receiving the running state of the first platform specific graphical user interface widget in serialized form over a network;

b) synchronizing the running state of the first platform specific graphical user interface widget with the running state of a corresponding platform independent graphical user interface widget in a platform independent presentation model;

c) after synchronizing the running state of the first platform specific graphical user interface, then customizing the platform independent presentation model to generate a second platform specific presentation for operation on a second heterogeneous device platform; and d) applying the running state from the platform independent graphical user interface widget to a corresponding second platform specific graphical user interface widget included in the second platform specific presentation to migrate the application from the first heterogeneous device platform to the second heterogeneous device platform.

7. The method of claim 6, further comprising e) displaying the running state on a display screen of the second heterogeneous device platform.

8. The method of claim 6, wherein a) comprises capturing at least one of state changes, appearance and data from the first platform specific graphical user interface widget.

9. The method of claim 6, wherein b) comprises updating the running state of the platform independent graphical user interface widget with the running state of the first platform specific graphical user interface widget.

10. The method of claim 6, wherein c) comprises dynamically rearranging the layout of the platform independent graphical user interface widget within a page to develop the second platform specific graphical user interface widget, the layout dynamically rearranged to fit within a display screen of the second heterogeneous device platform.

11. The method of claim 6, wherein c) comprises transforming the platform independent graphical user interface widget to another graphical user interface widget to develop the second platform specific graphical user interface widget when the platform independent graphical user interface widget does not fit within a display screen of the second heterogeneous device platform.

12. The method of claim 11, wherein transforming comprises converting the running state of the platform independent graphical user interface widget according to the widget types of the platform independent graphical user interface widget and the another graphical user interface widget.

13. The method of claim 6, wherein c) comprises: dynamically arranging the layout of the platform independent graphical user interface widget; and transforming the platform independent graphical user interface widget.

14. The method of claim 6, further comprising e) transmitting the second platform specific presentation to the second heterogeneous device platform over a network.

15. A scalable graphical user interface system for migrating the running state of an application graphical user interface from one heterogeneous device platform to another heterogeneous device platform, the scalable graphical user interface system comprising:

a first platform specific presentation that includes a first platform specific graphical user interface widget, wherein the first platform specific presentation is operable on a first heterogeneous device platform; and a server operable to receive the current running state of the first platform specific graphical user interface widget in serialized form over a network; and a platform independent presentation model accessible by the server, the server operable to synchronize the current running state of the first platform specific graphical user interface widget with the running state of a corresponding platform independent graphical user interface widget included in the platform independent presentation model, wherein the platform independent presentation model is customizable by the server to generate a second platform specific presentation capable of operation on a second heterogeneous device platform, and is customized by the server after the server synchronizes the current running state of the first platform specific graphical user interface widget with the running state of the corresponding platform independent graphical user interface widget, wherein the server is operable to apply the running state from the platform independent graphical user interface widget to a corresponding second platform specific graphical user interface widget included in the second platform specific presentation to migrate the application from the first heterogeneous device platform to the second heterogeneous device platform.

16. The scalable graphical user interface system of claim 15, wherein the running state comprises at least one of a state change of the platform specific graphical user interface widget, appearance of the first platform specific graphical user interface widget and data selectively included in the first platform specific graphical user interlace widget.

17. The scalable graphical user interlace system of claim 15, wherein the server is operable to transform the platform independent graphical user interface widget and the corresponding running state with a transformation rule as part of the customization.

18. The scalable graphical user interface system of claim 15, wherein the server is operable to change the layout of the platform independent graphical user interface widget while maintaining the running state as part of the customization.

19. The scalable graphical user interface system of claim 15, further comprising a network, wherein the server is operable to send and receive the running state over the network.

20. The method of claim 1 wherein the application comprises a scalable application, and further comprising the scalable application generating the platform independent presentation model.

21. The method of claim 6 wherein the application comprises a scalable application, and further comprising the scalable application generating the platform independent presentation model.

22. The scalable graphical user interface system of claim 15 wherein the application comprises a scalable application, and further comprising the scalable application generates the platform independent presentation model.

23. The method of claim 1, wherein implementing the current running state in the second platform specific presentation comprises displaying the current running state on a display screen of the second heterogeneous device platform.

24. The scalable graphical user interface system of claim 15, further comprising a display screen of the second heterogeneous device platform.

* * * * *